US 10,187,242 B2

(12) United States Patent
Yang et al.

(10) Patent No.: US 10,187,242 B2
(45) Date of Patent: Jan. 22, 2019

(54) SIGNAL TRANSMISSION METHOD AND APPARATUS

(71) Applicant: HUAWEI TECHNOLOGIES CO., LTD., Shenzhen (CN)

(72) Inventors: Yang Yang, Chengdu (CN); Xiaohu Tang, Chengdu (CN); Yalin Liu, Shanghai (CN); Jun Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 15/280,016

(22) Filed: Sep. 29, 2016

(65) Prior Publication Data
US 2017/0019287 A1 Jan. 19, 2017

Related U.S. Application Data

(63) Continuation of application No. PCT/CN2014/074632, filed on Apr. 2, 2014.

(51) Int. Cl.
H04L 27/26 (2006.01)
H04L 7/04 (2006.01)
(Continued)

(52) U.S. Cl.
CPC .......... H04L 27/2655 (2013.01); H04L 7/041 (2013.01); H04L 27/2613 (2013.01);
(Continued)

(58) Field of Classification Search
None
See application file for complete search history.

(56) References Cited

U.S. PATENT DOCUMENTS 7,920,599 B1 4/2011 Subramanian et al.
8,335,283 B1 * 12/2012 Sun .................. H04L 7/042
375/316
(Continued)

FOREIGN PATENT DOCUMENTS

CN 102347926 A 2/2012
CN 102939724 A 2/2013

OTHER PUBLICATIONS

International Search Report dated Jan. 5, 2015 in corresponding International Patent Application No. PCT/CN2014/074632.
(Continued)

Primary Examiner — Kodzovi Acolatse
(74) Attorney, Agent, or Firm — Staas & Halsey LLP

(57) ABSTRACT

Embodiments of the present invention provide a signal transmission method and apparatus, which can implement fast initial time synchronization. The method includes: generating, by a transmit-end device, an initial short training sequence, where the initial short training sequence includes M sub-sequences b, and the sub-sequence b includes N transmission sampling points; determining a quantity of reception sampling points used by a receive-end device when the receive-end device performs autocorrelation processing; generating a symbol sequence according to the quantity of the reception sampling points, and generating a target short training sequence according to the symbol sequence and the initial short training sequence; and sending a target signal to the receive-end device, where a short training sequence field of the target signal carries a short training sequence symbol, and the short training sequence symbol is used to indicate the target short training sequence.

20 Claims, 7 Drawing Sheets

(51) Int. Cl.
*H04W 52/52* (2009.01)
*H04W 84/12* (2009.01)

(52) U.S. Cl.
CPC ...... *H04L 27/2646* (2013.01); *H04L 27/2663* (2013.01); *H04L 27/2694* (2013.01); *H04W 52/52* (2013.01); *H04W 84/12* (2013.01)

(56) References Cited

U.S. PATENT DOCUMENTS

| | | | |
|---|---|---|---|
| 2010/0091911 A1* | 4/2010 | Sawai | H04L 5/0023 375/340 |
| 2011/0013575 A1* | 1/2011 | Liao | H04B 1/00 370/329 |
| 2011/0110470 A1 | 5/2011 | Yu et al. | |
| 2012/0269124 A1* | 10/2012 | Porat | H04W 72/1231 370/328 |
| 2013/0064124 A1* | 3/2013 | Sun | H04L 7/042 370/252 |
| 2013/0077463 A1 | 3/2013 | Zhang | |
| 2014/0003557 A1* | 1/2014 | Wu | H04L 25/0226 375/343 |
| 2014/0169591 A1* | 6/2014 | Link | H04N 21/233 381/123 |

OTHER PUBLICATIONS

Written Opinion of the International Searching Authority dated Jan. 5, 2015 in corresponding International Patent Application No. PCT/CN2014/074632.
Extended European Search report dated May 9, 2017 in corresponding European Patent Application No. 14888189.9.
Roger Pierre et al.:"Synchronization of Legacy 802.11 a/g devices Operating in IEEE 802.11n Networks", Jan. 1, 2010, XP55368296.
Eldad Perahia et al.: "Next Generation Wireless LANs; Throughput Robustness and Reliability in 802.11n" Cambridge University Press, 2008.
IEEE Computer Society: "Part 11: Wireless LAN Medium Access Control (MAC) and Physical Layer (PHY) Specifications" Mar. 29, 2012.
Byungjoon Park et al.: "A Novel Timing Estimation Method for OFDM Systems" IEEE Communication Letters, vol. 7, No. 5, May 2003.
H. Minn et al.: "On timing Offset Estimation for OFDM Systems" IEEE Communications Letters, vol. 4, No. 7, Jul. 2000.
International Search Report dated Jan. 5, 2015 in corresponding International Application No. PCT/CN2014/074632.

* cited by examiner

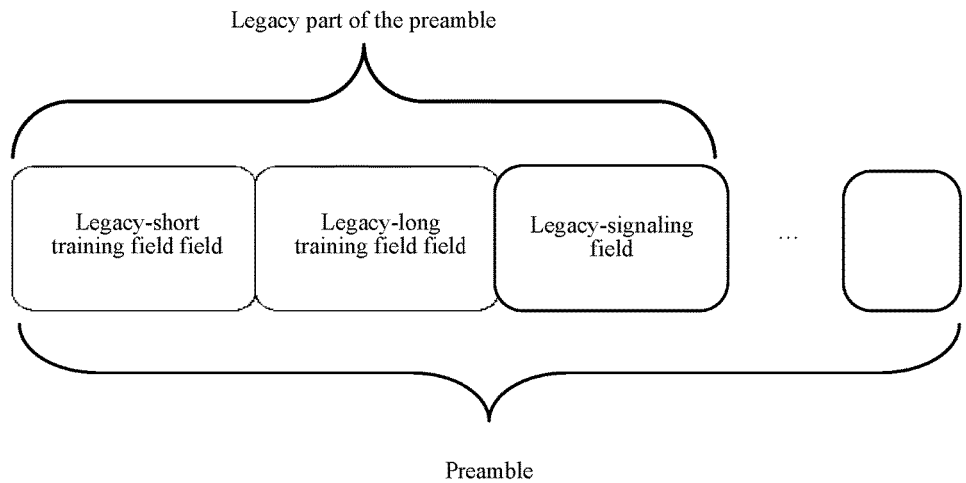

A transmit-end device generates an initial short training sequence, where the initial short training sequence includes $M$ sub-Sequences b, and the sub-sequence $b$ includes $N$ transmission sampling points — S110

Determine a quantity of reception sampling points used by a receive-end device when the receive-end device performs autocorrelation processing — S120

Generate a symbol sequence according to the quantity of the reception sampling points, and generate a target short training sequence according to the symbol sequence and the initial short training sequence, so that only one peak value greater than a preset target threshold exists in a processing result obtained through correlation processing that is performed by the receive-end device on the target short training sequence according to a preset rule — S130

Send a target signal to the receive-end device, where a short training sequence field field of the target signal carries a short training sequence symbol, and the short training sequence symbol is used to indicate the target training sequence — S140

FIG. 2

SIGNAL TRANSMISSION METHOD AND APPARATUS

CROSS-REFERENCE TO RELATED APPLICATIONS

This application is a continuation of International Patent Application No. PCT/CN2014/074632, filed on Apr. 2, 2014, the disclosure of which is hereby incorporated by reference in its entirety.

TECHNICAL FIELD

The present invention relates to the field of communications technologies, and more specifically, to a signal transmission method and apparatus.

BACKGROUND

With the development of semiconductor technologies and standardization of wireless local area networks (WLAN, Wireless Local Area Networks) in 802.11 standards, costs of WLAN technologies are also greatly reduced, and the WLAN technologies are also increasingly widely used. At present, versions of 802.11 standards have evolved from 802.11a/b to 802.11g, 802.11n, and 802.11ac, and an STF of a preamble in 802.11 ac performs initial time synchronization estimation. To ensure backward-compatibility and interoperability between products of different versions of 802.11 standards, a mixed format (MF, Mixed Format) preamble (which is referred to as preamble for short below) is defined from 802.11n. A legacy part of the preamble includes a legacy field that is the same as that of 802.11a.

FIG. 1 shows a structure of an existing preamble. As shown in FIG. 1, the legacy part of the preamble includes three fields, that is, a legacy-short training field (L-STF, Legacy-Short Training Field), a legacy-long training field (L-LTF, Legacy-Long Training Field), and a legacy-signaling (L-SIGs Legacy-Signaling) field, where the L-STF field is used for frame-start detection, automatic gain control (AGC, Automatic Gain Control) setting, initial frequency offset estimation, and initial time synchronization; the L-LTF is used for more accurate frequency offset estimation and time synchronization and is also used to perform channel estimation to demodulate the L-SIG more accurately; the L-SIG field is mainly used to carry data rate information and data length information, so that a receive-end device can determine, according to the data rate information and the data length information, a length of data carried in a same frame as that of the preamble, so as to determine a proper time for staying idle.

A short training sequence carried in the L-STF field from a transmit end includes multiple sub-sequences of a repetitive structure, and therefore has relatively strong autocorrelation. Therefore, at a receive end, initial time synchronization can be performed by using a falling edge of an autocorrelation value obtained through autocorrelation processing (in other words, an autocorrelation operation) performed on a received signal (which includes the short training sequence).

Besides, to increase robustness of an algorithm, in addition to the autocorrelation processing mentioned above, cross-correlation processing (in other words, an autocorrelation operation) may also be performed on a received signal and a locally known short training sequence. Because the short training sequence has optimal autocorrelation property, multiple peak values may be obtained through cross-correlation processing. Besides, as described above, a falling edge may be obtained through autocorrelation processing, and therefore an initial location of the L-STF field can be determined with reference to the last peak value and the falling edge.

However, a calculation amount of the foregoing processing is relatively large, calculation complexity is relatively high, and fast initial time synchronization cannot be implemented.

SUMMARY

The present invention provides a signal transmission method and apparatus, which can implement fast initial time synchronization.

According to a first aspect, a signal transmission method is provided, where the method includes: generating, by a transmit-end device, an initial short training sequence, where the initial short training sequence includes M sub-sequences b, and each sub-sequence b includes N transmission sampling points; determining a quantity of reception sampling points used by a receive-end device when the receive-end device performs correlation processing; generating a symbol sequence according to the quantity of the reception sampling points, where the symbol sequence is represented as $\{a_0, a_1, \ldots, a_i, \ldots, a_{K-1}\}$, and generating a target short training sequence according to the symbol sequence and the initial short training sequence, where the target short training sequence is represented as $\{a_0 b, a_1 b, \ldots, a_i b, \ldots, a_{K-1} b\}$, so that only one peak value greater than a preset target threshold exists in a processing result obtained through autocorrelation processing that is performed by the receive-end device on the target short training sequence according to a preset rule; and sending a target signal to the receive-end device, where a short training sequence field of the target signal carries a short training sequence symbol, and the short training sequence symbol is used to indicate the target short training sequence.

With reference to the first aspect, in a first implementation manner of the first aspect, the generating a symbol sequence according to the quantity of the reception sampling points includes: determining, according to the quantity of the reception sampling points, a polynomial $a_i \cdot a_{i+p} + a_{i+1} \cdot a_{i+1+p} + \cdots + a_{i+p-1} \cdot a_{i+2p-1}$, $i \in [0, M-2p]$, where the quantity of the reception sampling points is $2N \cdot p$, and $4 \leq 2p \leq M$; determining a target polynomial $a_{l_0} \cdot a_{l_0+p} + a_{l_0+1} \cdot a_{l_0+1+p} + \cdots + a_{l_0+p-1} \cdot a_{l_0 2p-1}$, where $l_0$ is a preset integer; setting the target polynomial to be equal to $\pm p$, and setting a non-target polynomial to be not equal to $\pm p$, to generate a target equation set, where the non-target polynomial is an expression in the polynomial except the target polynomial; and solving the target equation set, to generate the symbol sequence.

With reference to the first aspect and the foregoing implementation manner of the first aspect, in a second implementation manner of the first aspect, the determining a target polynomial includes: determining the target polynomial according to a quantity n of the sub-sequences b that are in the target short training sequence and that are used for automatic gain control AGC, to satisfy: $l_0 \geq n$.

With reference to the first aspect and the foregoing implementation manners of the first aspect, in a third implementation manner of the first aspect, M=10, p=2, $l_0=4$, and the target equation set is:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 = \pm 2 \\ a_5 \cdot a_7 + a_6 \cdot a_8 \neq \pm 2 \\ a_6 \cdot a_8 + a_7 \cdot a_9 \neq \pm 2 \end{cases}.$$

With reference to the first aspect and the foregoing implementation manners of the first aspect, in a fourth implementation manner of the first aspect, the symbol sequence is $\{1,1,1,-1,1,1,1,1,-1,1\}$, and the target short training sequence is $\{b,b,b,-b,b,b,b,b,-b,b\}$.

According to a second aspect, a signal transmission method is provided, where the method includes: determining a quantity of reception sampling points; when a signal is received, performing autocorrelation processing on the signal according to the quantity of the reception sampling points and based on a preset rule, where the signal includes a target signal from a transmit-end device, a short training sequence field of the target signal carries a short training sequence symbol, the short training sequence symbol is used to indicate a target short training sequence, the target sequence is generated by the transmit-end device according to a symbol sequence and an initial short training sequence after the transmit-end device generates the initial short training sequence, and the symbol sequence is generated by the transmit-end device according to the quantity of the reception sampling points, so that only one peak value greater than a preset target threshold exists in a processing result obtained through the autocorrelation processing; and determining a location of the peak value, and performing initial time synchronization on the target signal according to the location of the peak value.

With reference to the second aspect, in a first implementation manner of the second aspect, the performing autocorrelation processing on a signal according to the quantity of the reception sampling points and based on a preset rule includes: performing autocorrelation processing on the target signal according to the following formula:

$$R(d) = \frac{\left(\sum_{k=d}^{d+Np-1} r_k r_{k+Np}^*\right)^2}{\left(\sum_{k=d}^{d+Np-1} |r_k|^2\right) \cdot \left(\sum_{k=d}^{d+Np-1} |r_{k+Np}|^2\right)},$$

where N is a quantity of transmission sampling points included in a sub-sequence b, r represents a sampling value of the received signal, the quantity of the reception sampling points is 2N·p, and d represents an initial reception sampling point used for the correlation processing.

With reference to the second aspect and the foregoing implementation manner of the second aspect, in a second implementation manner of the second aspect, the determining a location of the peak value includes: determining the location of the peak value according to the target threshold.

With reference to the second aspect and the foregoing implementation manners of the second aspect, in a third implementation manner of the second aspect, the symbol sequence is generated by the transmit-end device by solving a target equation set, and the target equation set is generated by setting a target polynomial in a polynomial to be equal to ±p and setting a non-target polynomial in the polynomial to be not equal to ±p, where the polynomial is $a_i \cdot a_{i+p} + a_{i+1} \cdot a_{i+1+p} + \ldots + a_{i+p-1} \cdot a_{i+2p-1}$, $i \in [0, M-2p]$, the quantity of the reception sampling points is 2N·p, 4≤2p≤M, the target polynomial is $a_{l_0} \cdot a_{l_0+p} + a_{l_0+1} \cdot a_{l_0+1+p} + \ldots + a_{l_0+p-1} \cdot a_{l_0+2p-1}$, $l_0$ is a preset integer, and the non-target polynomial is an expression in the polynomial except the target polynomial.

With reference to the second aspect and the foregoing implementation manners of the second aspect, in a fourth implementation manner of the second aspect, the target polynomial is determined by the transmit-end device according to a quantity n of the sub-sequences b that are in the target short training sequence and that are used for automatic gain control AGC, where $l_0 \geq n$.

With reference to the second aspect and the foregoing implementation manners of the second aspect, in a fifth implementation manner of the second aspect, M=10, p=2, $l_0$=4, and the target equation set is:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}.$$

With reference to the second aspect and the foregoing implementation manners of the second aspect, in a sixth implementation manner of the second aspect, the symbol sequence is $\{1,1,1,-1,1,1,1,1,-1,1\}$, and the target short training sequence is $\{b,b,b,-b,b,b,b,b,-b,b\}$.

With reference to the second aspect and the foregoing implementation manners of the second aspect, in a seventh implementation manner of the second aspect, the performing initial time synchronization on the target signal according to the location of the peak value includes: determining that the location of the peak value is an $(l_0 \cdot N+1)^{th}$ point in the target short training sequence.

According to a third aspect, a signal transmission apparatus is provided, where the apparatus includes: an initial short training sequence generating unit, configured to generate an initial short training sequence, where the initial short training sequence includes M sub-sequences b, and each sub-sequence b includes N transmission sampling points; a determining unit, configured to determine a quantity of reception sampling points used by a receive-end device when the receive-end device performs correlation processing; a target short training sequence generating unit, configured to generate a symbol sequence according to the quantity of the reception sampling points, where the symbol sequence is represented as $\{a_0, a_1, \ldots, a_i, \ldots, a_{K-1}\}$, and generate a target short training sequence according to the symbol sequence and the initial short training sequence, where the target short training sequence is represented as $\{a_0 b, a_1 b, \ldots, a_i b, \ldots, a_{K-1} b\}$, so that only one peak value greater than a preset target threshold exists in a processing result obtained through correlation processing that is performed by the receive-end device on the target short training sequence according to a preset rule; and a sending unit, configured to send a target signal to the receive-end device, where a short training sequence field of the target signal carries a short training sequence symbol, and the short training sequence symbol is used to indicate the target short training sequence.

With reference to the third aspect, in a first implementation manner of the third aspect, the target short training sequence generating unit is specifically configured to: determine, according to the quantity of the reception sampling points, a polynomial $a_i \cdot a_{i+p} + a_{i+1} \cdot a_{i+1+p} + \ldots + a_{i+p-1} \cdot a_{i+2p-1}$, $i \in [0, M-2p]$, where the quantity of the reception sampling points is $2N \cdot p$ and $4 \leq 2p \leq M$; determine a target polynomial $a_{l_0} \cdot a_{l_0+p} + a_{0_0+1} \cdot a_{l_0+1+p} + \ldots + a_{l_0+p-1} \cdot a_{l_0+2p-1}$, where $l_0$ is a preset integer; set the target polynomial to be equal to $\pm p$, and set a non-target polynomial to be not equal to $\pm p$, to generate a target equation set, where the non-target polynomial is an expression in the polynomial except the target polynomial; and solve the target equation set, to generate the symbol sequence.

With reference to the third aspect and the foregoing implementation manner of the third aspect, in a second implementation manner of the third aspect, the target short training sequence generating unit is specifically configured to determine the target polynomial according to a quantity n of the sub-sequences b that are in the target short training sequence and that are used for automatic gain control AGC, to satisfy: $l_0 \geq n$.

With reference to the third aspect and the foregoing implementation manners of the third aspect, in a third implementation manner of the third aspect, $M=10$, $p=2$, $l_0=4$, and the target equation set is:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}.$$

With reference to the third aspect and the foregoing implementation manners of the third aspect, in a fourth implementation manner of the third aspect, the symbol sequence is $\{1,1,1,-1,1,1,1,1,-1,1\}$, and the target short training sequence is $\{b,b,b,-b,b,b,b,b,-b,b\}$.

According to a fourth aspect, a signal transmission apparatus is provided, where the apparatus includes: a determining unit, configured to determine a quantity of reception sampling points; a receiving unit, configured to receive a signal; and an autocorrelation processing unit, configured to perform autocorrelation processing on the signal according to the quantity of the reception sampling points and based on a preset rule, where the signal includes a target signal from a transmit-end device, a short training sequence field of the target signal carries a short training sequence symbol, the short training sequence symbol is used to indicate a target short training sequence, the target sequence is generated by the transmit-end device according to a symbol sequence and an initial short training sequence after the transmit-end device generates the initial short training sequence, and the symbol sequence is generated by the transmit-end device according to the quantity of the reception sampling points, so that only one peak value greater than a preset target threshold exists in a processing result obtained through the autocorrelation processing; and the determining unit is further configured to determine a location of the peak value, and perform initial time synchronization on the target signal according to the location of the peak value.

With reference to the fourth aspect, in a first implementation manner of the fourth aspect, the autocorrelation processing unit is specifically configured to perform autocorrelation processing on the target signal according to the following formula:

$$R(d) = \frac{\left(\sum_{k=d}^{d+Np-1} r_k r_{k+Np}^*\right)^2}{\left(\sum_{k=d}^{d+Np-1} |r_k|^2\right) \cdot \left(\sum_{k=d}^{d+Np-1} |r_{k+Np}|^2\right)},$$

where N is a quantity of transmission sampling points included in a sub-sequence b, r represents a sampling value of the received signal, the quantity of the reception sampling points is $2N \cdot p$, and d represents an initial reception sampling point used for the correlation processing.

With reference to the fourth aspect and the foregoing implementation manner of the fourth aspect, in a second implementation manner of the fourth aspect, the determining unit is specifically configured to determine the location of the peak value according to the target threshold, where the peak value is greater than the target threshold.

With reference to the fourth aspect and the foregoing implementation manners of the fourth aspect, in a third implementation manner of the fourth aspect, the symbol sequence is generated by the transmit-end device by solving a target equation set, and the target equation set is generated by setting a target polynomial in a polynomial to be equal to $\pm p$ and setting a non-target polynomial in the polynomial to be not equal to $\pm p$, where the polynomial is $a_i \cdot a_{i+p} + a_{i+1} \cdot a_{i+1+p} + \ldots + a_{i+p-1} \cdot a_{i+2p-1}$, $i \in [0, M-2p]$, the quantity of the reception sampling points is the target polynomial is $a_{l_0} \cdot a_{l_0+p} + a_{l_0+1} \cdot a_{l_0+1+p} + \ldots + a_{l_0+p-1} \cdot a_{l_02p-1}$, $l_0$ is a preset integer, and the non-target polynomial is an expression in the polynomial except the target polynomial.

With reference to the fourth aspect and the foregoing implementation manners of the fourth aspect, in a fourth implementation manner of the fourth aspect, the target polynomial is determined by the transmit-end device according to a quantity n of the sub-sequences b that are in the target short training sequence and that are used for automatic gain control AGC, where $l_0 \geq n$.

With reference to the fourth aspect and the foregoing implementation manners of the fourth aspect, in a fifth implementation manner of the fourth aspect, $M=10$, $p=2$, $l_0=4$, and the target equation set is:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}.$$

With reference to the fourth aspect and the foregoing implementation manners of the fourth aspect, in a sixth implementation manner of the fourth aspect, the symbol sequence is $\{1,1,1,-1,1,1,1,1,-1,1\}$, and the target short training sequence is $\{b,b,b,-b,b,b,b,b,-b,b\}$.

With reference to the fourth aspect and the foregoing implementation manners of the fourth aspect, in a seventh implementation manner of the fourth aspect, the determining unit is specifically configured to determine that the location of the peak value is an $(l_0 \cdot N+1)^{th}$ point in the target short training sequence.

According to the signal transmission method and apparatus of the embodiments of the present invention, a target short training sequence needing to be sent to a receive-end device is determined by using a quantity of reception sampling points used by the receive-end device when the receive-end device performs correlation processing, so that only one peak value greater than a preset target threshold exists in a processing result obtained through correlation processing that is performed by the receive-end device on the target short training sequence according to a preset rule, so that the receive-end device can perform initial time synchronization according to a location of the peak value, and can implement fast initial time synchronization.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram that shows a structure of a preamble in the prior art;

FIG. 2 is a schematic flowchart of a signal transmission method according to an embodiment of the present invention;

DESCRIPTION OF EMBODIMENTS

Figure 3:
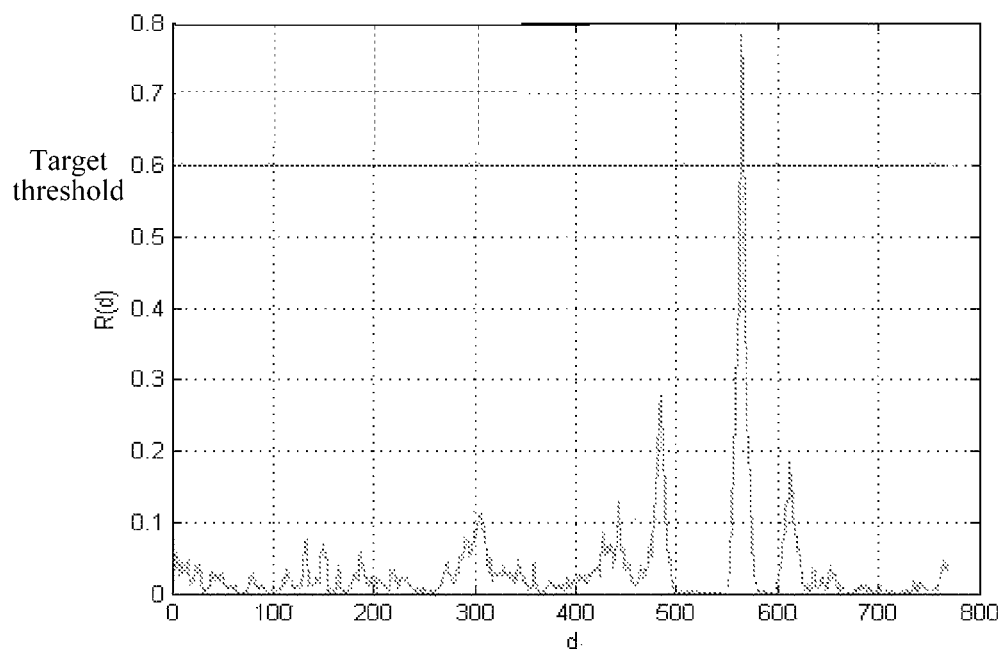
FIG. 3 is a simulation diagram of a relationship between a decision variable R(d) and d according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems that need to notify, by using a preamble, a communications peer end of information such as a data rate and a data length of transmitted data, for example, a wireless local area network (WLAN, Wireless Local Area Network) system, and a Wireless Fidelity (Wi-Fi, Wireless Fidelity) system.

Correspondingly, a transmit end may be a station (STA, Station) in a WLAN. The station may also be referred to as a subscriber unit, an access terminal, a mobile station, a mobile terminal, a remote station, a remote terminal, a mobile device, a user terminal, a terminal, a wireless communications device, user agent, a user apparatus, or UE (User Equipment, user equipment). The STA may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device having a wireless local area network (for example, Wi-Fi) communication function, a computing device, or another processing device connected to a wireless modem.

Besides, a transmit end may also be an access point (AP, Access Point) in the WLAN, and the access point may be used to perform communication with an access terminal by means of a wireless local area network, and transmits data of the access terminal to a network side or transmits data from a network side to the access terminal.

In the following, for ease of understanding and description, as an example but not a limitation, an execution process and action in the Wi-Fi system are described for a signal transmission method and apparatus of the present invention.

In addition, aspects or features of the present invention may be implemented as a method, an apparatus or a product that uses standard programming and/or engineering technologies. The term "product" used in this application covers a computer program that can be accessed from any computer-readable component, carrier or medium. For example, a computer-readable medium may include, but is not limited to: a magnetic storage device (such as a hard disk, a floppy disk, or a magnetic tape), an optical disc (such as a CD (Compact Disk, compact disk), or a DVD (Digital Versatile Disk, digital versatile disc)), a smartcard and a flash memory device (such as an EPROM (Erasable Programmable Read-Only Memory, erasable programmable read-only memory), a card, a stick, or a key drive). In addition, various storage media described in this specification may indicate one or more devices and/or other machine-readable media that are used to store information. The term "machine-readable media" may include but is not limited to a radio channel, and various other media that can store, contain and/or carry an instruction and/or data.

FIG. 2 is a schematic flowchart of a signal transmission method 100 according to an embodiment of the present invention described from the perspective of a transmit-end device. As shown in FIG. 2, the method 100 includes:

S110: A transmit-end device generates an initial short training sequence, where the initial short training sequence includes M sub-sequences b, and the sub-sequence b includes N transmission sampling points.

S120: Determine a quantity of reception sampling points used by a receive-end device when the receive-end device performs autocorrelation processing.

S130: Generate a symbol sequence according to the quantity of the reception sampling points, where the symbol sequence is represented as $\{a_0, a_1, \ldots, a_i, \ldots, a_{K-1}\}$, and generate a target short training sequence according to the symbol sequence and the initial short training sequence, where the target short training sequence is represented as $\{a_0 b, a_1 b, \ldots, a_i b, \ldots, a_{K-1} b\}$, so that only one peak value greater than a preset target threshold exists in a processing result obtained through autocorrelation processing that is performed by the receive-end device on the target short training sequence according to a preset rule.

S140: Send a target signal to the receive-end device, where a short training sequence field of the target signal carries a short training sequence symbol, and the short training sequence symbol is used to indicate the target short training sequence.

Specifically, in S110, when data needs to be sent to the receive-end device, the transmit-end device may generate the initial short training sequence according to the following expression 1:

$$S_{-26,26} = \sqrt{1/2} \times \{0, 0, 1+j, 0, 0, 0, -1-j, 0, 0, 0, 1+j, 0, 0,$$
$$0, -1-j, 0, 0, 0, -1-j, 0, 0, 0, 1+j, 0, 0, 0,$$
$$0, 0, 0, 0, -1-j, 0, 0, 0, -1-j, 0, 0, 0, 1+j,$$
$$0, 0, 0, 1+j, 0, 0, 0, 1+j, 0, 0, 0, 1+j, 0, 0\}. \quad \text{Expression 1}$$

Specifically, an existing communications system provides 64 subcarriers, and sequence numbers of the subcarriers may be −32 to 31. In this embodiment of the present invention, when, for example, frequency domain replication, inverse fast Fourier transformation (IFFT, Inverse Fast Fourier Transform), and normalization processing are performed, subcarriers (in other words, sampling points in subcarriers) whose sequence numbers are −26 to 26 may be used, and values are assigned to sampling points (which are referred to as transmission sampling points in the following for ease of distinguishing) whose sequence numbers are −26 to 26 according to the expression 1, and 0 is added to locations at which sequence numbers are −32 to −27 and 27 to 31, so that a time domain sequence that includes four duplicates of a same sub-sequence is generated after the foregoing frequency domain replication, IFFT, and normalization processing, the sub-sequence is recorded as b, and the time domain sequence is represented as (b,b,b,b), where one sub-sequence includes 16 transmission sampling points. Then, a sequence (b,b,b,b,b) is generated by adding a cyclic prefix of a sub-sequence b, where a quantity of transmission sampling points included in the sequence (b,b,b,b,b) is a length (80 points) of an orthogonal frequency division multiplexing (OFDM, Orthogonal Frequency Division Multiplexing) symbol. Because in addition to being used for frame-start detection and initial time synchronization, a short training sequence is further used for AGC setting, initial frequency offset estimation, and the like, the sequence (b,b,b,b,b) may be duplicated to generate an initial short training sequence (b,b,b,b,b,b,b,b,b) that includes 10 sub-sequences b.

It should be noted that, the above-described method of generating an initial short training sequence is merely an exemplary description, and the present invention is not limited thereto, for example, a quantity of sub-sequences included in the initial short training sequence and a quantity of transmission sampling points included in the sub-sequence may be changed arbitrarily, which is not specifically limited in the present invention.

In the following description, for ease of understanding, an example in which the initial short training sequence includes 10 sub-sequences b, that is, M=10, and the sub-sequence b includes 16 transmission sampling points, that is N=16, is described.

In S120, the transmit-end device may determine the quantity of the reception sampling points used by the receive-end device when the receive-end device performs autocorrelation processing (in other words, an autocorrelation operation) on a received signal, where the "quantity of reception sampling points" refers to a quantity of sampling points used when autocorrelation processing is performed on sampling points in the received signal, and for ease of distinguishing, a sampling point in a signal received by a receive end is referred to as a "reception sampling point" in the following. Moreover, a method and process of performing correlation processing on the received signal by the receive end are described in detail later. It should be noted that, in this embodiment of the present invention, to find the peak value, the receive-end device may need to perform correlation processing on the received signal for multiple times according to a receiving order of the reception sampling points, and obtain, in turn, processing values corresponding to multiple reception sampling points, where a quantity of reception sampling points used for each autocorrelation processing is the same.

In addition, in this embodiment of the present invention, the autocorrelation processing may also be referred to as an autocorrelation operation, and may refer to a process of performing an autocorrelation operation on input data (herein, a sampling value of a received signal) according to a preset algorithm rule to obtain a processing value. Detailed description is provided later with reference to processing of the receive-end device.

In this embodiment of the present invention, a specific value of the quantity of the reception sampling points may be preset by a manager, a provider, or the like and stored in a transmit end or a receive end, or may be determined through negotiation by transmit-end and receive-end devices, and the specific value of the quantity of the reception sampling points may be set once and used by default for each transmission, or may change periodically, which is not specifically limited in the present invention.

In S130, the transmit-end device may determine the symbol sequence according to the quantity of the reception sampling points that is determined in S120, and generate, according to the symbol sequence and the initial short training sequence that is generated in S110, the target short training sequence that needs to be carried in an L-STF field and to be sent to the receive-end device.

A method of generating the symbol sequence is described first in the following.

Optionally, the generating a symbol sequence according to the quantity of the reception sampling points includes:

determining, according to the quantity of the reception sampling points, a polynomial $a_i \cdot a_{i+p} + a_{i+1} \cdot$ $a_{i+1+p} + \ldots + a_{i+p-1} \cdot a_{i+2p-1}$, $i \in [0, M-2p]$, where the quantity of the reception sampling points is $2N \cdot p$, and $4 \leq 2p \leq M$;

determining a target polynomial $a_{l_0} \cdot a_{l_0+p} + a_{l_0+1} \cdot a_{l_0+1+p} + \ldots + a_{l_0+p-1} \cdot a_{l_0+2p-1}$, where $l_0$ is a preset integer;

setting the target polynomial to be equal to $\pm p$, and setting a non-target polynomial to be not equal to $\pm p$, to generate a target equation set, where the non-target polynomial is an expression in the polynomial except the target polynomial; and solving the target equation set, to generate the symbol sequence.

Specifically, in this embodiment of the present invention, the symbol sequence may be used to determine a symbol of the generated initial short training sequence described above, and therefore, in this embodiment of the present invention, a quantity of elements included in the symbol sequence is equal to a quantity of sub-sequences included in the initial short training sequence. The quantity of the reception sampling points is set to $2N \cdot p$, then a value of p may be determined, and then the polynomial $a_i \cdot a_{i+p} + a_{i+1} \cdot a_{i+1+p} + \ldots + a_{i+p-1} \cdot a_{i+2p-1}$, $i \in [0, M-2p]$ may be determined according to the value of p. Besides, in this embodiment of the present invention, the value of p may be determined according to the quantity of the reception sampling points that is determined in S120, for example, may be predetermined according to values of M and N, to satisfy $4 \leq 2p \leq M$, which is not specifically limited in the present invention. For example, in a case in which M=10 and N=16, a value range of p may be any integer from 2 to 5.

For example, when p=2, polynomials (a) to (g) shown below may be obtained:

$$a_0 \cdot a_2 + a_1 \cdot a_3 \quad \text{(a)};$$

$$a_1 \cdot a_3 + a_2 \cdot a_4 \quad \text{(b)};$$

$$a_2 \cdot a_4 + a_3 \cdot a_5 \quad \text{(c)};$$

$$a_3 \cdot a_5 + a_4 \cdot a_6 \quad \text{(d)};$$

$$a_4 \cdot a_6 + a_5 \cdot a_7 \quad \text{(e)};$$

$$a_5 \cdot a_7 + a_6 \cdot a_8 \quad \text{(f); and}$$

$$a_6 \cdot a_8 + a_7 \cdot a_9 \quad \text{(g)}.$$

Then, one target polynomial may be determined from the polynomials (a) to (g), and the target polynomial is set to be equal to $\pm p$, and the rest other expressions (that is, non-target polynomials) are set to be not equal to $\pm p$, so as to form a target equation set; therefore specific values of $a_0 \sim a_9$ can be determined by solving the target equation set, and then the symbol sequence $\{a_0, a_1, a_2, a_3, a_4, a_5, a_6, a_7, a_8, a_9\}$ can be determined.

Besides, in this embodiment of the present invention, the foregoing target polynomial may be randomly selected from the polynomials (a) to (g), which is not specifically limited in the present invention.

It should be noted that, in this embodiment of the present invention, the target polynomial may be represented as $a_{l_0} \cdot a_{l_0+p} + a_{l_0+1} \cdot a_{l_0+1+p} + \ldots + a_{l_0+p-1} \cdot a_{l_0+2p-1}$, $l_0$ may be preset, and a location of $a_{l_0}$ in the symbol sequence, in other words, a location of $a_{l_0}b$ in the target short training sequence may correspond to a location of a peak value obtained through autocorrelation processing that is performed by the receive-end device on a received signal (later, the correspondence is described in detail with reference to processing of the receive-end device), and therefore, $l_0$ may be set in the transmit-end device according to an expected location at which the peak value appears.

For example, the determining a target polynomial includes:

determining the target polynomial according to a quantity n of the sub-sequences b that are in the target short training sequence and that are used for automatic gain control AGC, to satisfy: $l_0 \geq n$.

Specifically, in this embodiment of the present invention, the target short training sequence generated according to the symbol sequence and the initial short training sequence may be used for AGC estimation. Besides, in this embodiment of the present invention, the AGC estimation performed by the receive-end device may be performed before time synchronization and frame-start detection, in other words, a location, of a sub-sequence that is used for the AGC estimation and that is of the target short training sequence, in the target short training sequence may be located before locations, of sub-sequences used for the time synchronization and the frame-start detection, in the target short training sequence. For example, in this embodiment of the present invention, a quantity of sub-sequences, used for the AGC estimation, of the target short training sequence is set to n, and then the AGC estimation may be performed by using sub-sequences $a_0b$ to $a_{n-1}b$ in the target short training sequence. Therefore, to ensure performing of the time synchronization and the frame-start detection, it is expected that the location of the peak value appears after the sub-sequence $a_{n-1}b$ (specifically, transmission sampling points included in the sub-sequence $a_{n-1}b$) in the target short training sequence, so that in this embodiment of the present invention, when $l_0$ is set, $l_0 \geq n$ can be enabled. It should be noted that, in a normal case, the quantity of the sub-sequences, used for the AGC estimation, of the target short training sequence may be 4. Therefore, in this embodiment of the present invention, preferably, $l_0 \geq 4$.

As described above, without loss of generality, it is set that M=10, p=2, and $l_0=4$, and then the target equation set may be:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}.$$

Therefore, the specific values of $a_0 \sim a_9$ may be obtained by solving the equation set, and a group of solutions thereof is:

$$\begin{cases} a_0 = 1 \\ a_1 = 1 \\ a_2 = 1 \\ a_3 = -1 \\ a_4 = 1 \\ a_5 = 1 \\ a_6 = 1 \\ a_7 = 1 \\ a_8 = -1 \\ a_9 = 1 \end{cases}.$$

Therefore, a symbol sequence {1,1,1,−1,1,1,1,1,−1,1,} may be generated, and then a target short training sequence {b,b,b,−b,b,b,b,b,−b,b} may be obtained. It can be seen that, last five elements in the symbol sequence are a duplicate of first five elements. Therefore, when the symbol sequence or the target short training sequence is actually generated, just first five sub-sequences are generated, and the five sub-sequences are duplicated, and then the symbol sequence or the target short training sequence can be generated, which can further improve processing efficiency.

It should be understood that, the above-described symbol sequence, in other words, specific values of $a_0 \sim a_9$ is merely an exemplary description, and the present invention is not limited thereto. After the foregoing target equation set is solved, multiple groups of solutions can be obtained, and the objective of the present invention can be achieved by using any group of solutions, that is, the solutions can be selected randomly for use.

Besides, the above-described specific values of parameters are merely an exemplary description, and the present invention is not limited thereto. For example, when p=3, the polynomials may be represented as:

$a_0 \cdot a_3 + a_1 \cdot a_4 + a_2 \cdot a_5;$ $a_1 \cdot a_4 + a_2 \cdot a_5 + a_3 \cdot a_6;$ $a_2 \cdot a_5 + a_3 \cdot a_6 + a_4 \cdot a_7;$ $a_3 \cdot a_6 + a_4 \cdot a_7 + a_5 \cdot a_8;$ and $a_4 \cdot a_7 + a_5 \cdot a_8 + a_6 \cdot a_9.$ Correspondingly, it is set that M=10 p=3 and $l_0$=4, and then the target equation set may be:

$$\begin{cases} a_0 \cdot a_3 + a_1 \cdot a_4 + a_2 \cdot a_5 \neq \pm 3 \\ a_1 \cdot a_4 + a_2 \cdot a_5 + a_3 \cdot a_6 \neq \pm 3 \\ a_2 \cdot a_5 + a_3 \cdot a_6 + a_4 \cdot a_7 \neq \pm 3 \\ a_3 \cdot a_6 + a_4 \cdot a_7 + a_5 \cdot a_8 \neq \pm 3 \\ a_4 \cdot a_7 + a_5 \cdot a_8 + a_6 \cdot a_9 = \pm 3 \end{cases}$$

After the target short training sequence is generated as described above, in S140, the transmit-end device may add, to the short training sequence field of the target signal (specifically, at a physical layer of the target signal) that needs to be sent to the receive-end device, the short training sequence symbol used to indicate the target short training sequence, and send the target signal to the receive-end device.

It should be noted that, as an example but not a limitation, in this embodiment of the present invention, the short training sequence symbol may be a symbol of an analog signal that is generated by the transmit-end device by performing digital-to-analog conversion processing, up-conversion processing, filtering processing, or the like on the foregoing target short training sequence.

Besides, the above-described values of M, N, p, and $l_0$ are merely an exemplary description, and the present invention is not limited thereto; the values may be set arbitrarily as long as the polynomial $a_i \cdot a_{i+p} + a_{i+1} \cdot a_{i+1+p} + \ldots + a_{i+p-1} \cdot a_{i+2p-1}$, where $i \in [0, M-2p]$ is satisfied.

A process of performing frame-start detection by the receive-end device after receiving a signal (which includes the foregoing generated target short training sequence in the target signal) is described in the following in detail.

Specifically, it is assumed that the signal (specifically, a sampling value of the received signal, and the sampling value may be a complex number and include a real component and an imaginary component) received by the receive-end device is r, where the signal r includes noise and the target signal from the transmit-end device. In this embodiment of the present invention, the foregoing determined target short training sequence may be used to enable the receive-end device to complete initial time synchronization on the target signal.

In this embodiment of the present invention, the receive-end device may define the following decision variable R(d), and perform initial time synchronization according to R(d).

As described above, when the foregoing determined quantity of the reception sampling points is represented as 2N·p, the receive-end device may perform in turn, based on the following expression 2, autocorrelation processing on multiple reception sampling points, to obtain multiple processing values:

$$R(d) = \frac{\left(\sum_{k=d}^{d+Np-1} r_k r_{k+Np}^*\right)^2}{\left(\sum_{k=d}^{d+Np-1} |r_k|^2\right) \cdot \left(\sum_{k=d}^{d+Np-1} |r_{k+Np}|^2\right)}.$$  Expression 2 d represents an initial reception sampling point used for autocorrelation processing (in other words, an autocorrelation operation) performed once. In this embodiment of the present invention, an initial value of d is 1, and thereafter, each time autocorrelation processing is performed, 1 is added to d in turn, that is, a processing value obtained through correlation processing of the first time is a processing value R(1) corresponding to the first reception sampling point, a processing value obtained through correlation processing of the second time is a processing value R(2) corresponding to the second reception sampling point, and so on, until the peak value is found.

$$\sum_{k=d}^{d+Np-1} r_k r_{k+Np}^*$$

represents an autocorrelation function of 2N·p points that start from the reception sampling point d.

$$\sum_{k=d}^{d+Np-1} |r_k|^2$$

represents an energy value of first N·p points in the 2N·p points.

$$\sum_{k=d}^{d+Np-1} |r_{k+Np}|^2$$

represents an energy value of last N·p points in the 2N·p points.

In a case in which noise is neglected, it can be known from Cauchy inequality that: only when there is a complex number $\lambda$ that makes $r_k=\lambda r_{k+Np}$ true for arbitrary $d \leq k \leq d+Np-1$, $R(d)$ reaches the peak value.

In this embodiment of the present invention, because the transmit-end device determines the target polynomial $a_{l_0} \cdot a_{l_0+p}+a_{l_0+1} \cdot a_{l_0+1+p}+ \ldots +a_{l_0+p-1} \cdot a_{l_0 2p-1}=\pm p$, and makes the non-target polynomial not equal to $\pm p$, it can be ensured that the complex number $\lambda$ and an unique positive integer $l_0$ exist, where $d=l_0 \cdot N+1$, and $r_k=\lambda r_{k+Np}$ is true for arbitrary $d \leq k \leq d+Np-1$.

Therefore, it can be ensured that only one peak value greater than a preset target threshold $\delta$ exists in $R(d)$ obtained through the foregoing correlation processing by the receive-end device. It should be noted that, in this embodiment of the present invention, the target threshold $\delta$ may be pre-determined by the receive-end device in a manner such as pre-testing or simulation.

Near the peak value of $R(d)$, when $d \leq l_0 \cdot N$, with the increase of a value of d, a value of $R(d)$ tends to increase, and when $d > l_0 \cdot N$ with the increase of the value of d, the value of $R(d)$ tends to decrease; therefore, in this embodiment of the present invention, the following operations may be performed by using a property that the target threshold $\delta$ and $R(d)$ first increase and then decrease near the peak value, to find the location of the peak value.

In this embodiment of the present invention, time delay may be performed according to system parameters (such as a bandwidth, a modulation and coding scheme (MCS, Modulation and Coding Scheme), a channel model, a data length, an antenna quantity, equalization, frequency offset, and the like), so that target thresholds $\delta$ corresponding to different system parameters are obtained, and in an actual signal receiving process, a corresponding target threshold $\delta$ may be selected according to currently used system parameters.

The following Table 1 gives an example of a correspondence between the system parameters and the target threshold $\delta$.

TABLE 1

| | |
|---|---|
| Bandwidth | 20 MHz |
| MCS | 0 |
| Channel model | Additive white Gaussian noise (AWGN, Additive White Gaussian Noise) channel model |
| Data length | 100 |
| Antenna quantity | 1 × 1 |
| Equalization | Zero forcing (ZF, Zero Forcing) |
| Frequency offset | Obey a Gaussian distribution having a mean value of 0 and a variance of 1 |
| Target threshold $\delta$ | 0.6 |

A specific process of determining the peak value by the receive-end device is:

1. Determine the target threshold according to the currently used system parameters.

2. Calculate, according to the foregoing expression 2 and according to an arrangement order of the reception sampling points, in turn $R(d)$ values corresponding to reception sampling points, until $d_0$ that makes $R(d_0) > \delta$ appears, and in this case, record $d_{max}=d_0$ and $R_{max}=R(d_0)$.

3. Set $d_1=d_{max}+1$, and calculate $R(d_1)$.

4. Determine a relationship between $R(d_1)$ and $R_{max}$ and if $R(d_1) > R_{max}$, update $d_{max}$ and $R_{max}$, to make $d_{max}=d_1$ and $R_{max}=R(d_1)$, and go back to step 3; or if $R(d_1) < R_{max}$, go to step 5.

5. Use the location of the peak value (in other words, a reception sampling point corresponding to the peak value) as an $(l_0 \cdot N+1)^{th}$ sampling point in the target short training sequence, so as to complete initial time synchronization.

It should be noted that, due to impact of noise, after a timing point (the reception sampling point corresponding to the location of the peak value) of the initial time synchronization is obtained, proper adjustment may be performed, for example, reception sampling points of a preset quantity (for example, two) are rolled back, so that the timing point falls within a range of a cyclic prefix of an OFDM symbol.

According to the method of this embodiment of the present invention, initial time synchronization can be completed by finding only the location of the peak value; while in the prior art, autocorrelation and cross-correlation operations for an entire short training sequence need to be completed to obtain a falling edge of the foregoing platform, so as to complete initial time synchronization. Obviously, processing complexity of this embodiment of the present invention is lower.

It should be understood that, the above-described method of determining the location of the peak value by the receive-end device is merely an exemplary description, and the present invention is not limited thereto. For example, the foregoing target threshold $\delta$ may not be used, but comparison is directly performed on processing values of correlation processing that are obtained through calculation and that correspond to the reception sampling points, so as to determine the location of the peak value.

Without loss of generality, in a case in which a system bandwidth is 20 MHz, M=10, N=16, four sub-sequences in the target short training sequence are used for performing AGC processing (that is, $l_0=4$), and the quantity of the reception sampling points is $2N \cdot p=64$, an effect of the signal transmission method of the present invention is described in the following with reference to a simulation result.

At a transmit end: as described in S110 to S140, in a condition of the foregoing parameters, the symbol sequence generated by the transmit-end device is {1,1,1,−1,1,1,1,1,1,−1,1}, and the target short training sequence generated by the transmit-end device is {b,b,b,−b,b,b,b,b,−b,b}. Because the transmit-end device sets $l_0=4$, according to the setting of the transmit-end device, a location of the peak value that is obtained through correlation processing performed by the receive-end device should appear at the $(4 \times 16+1=65)^{th}$ point in the target short training sequence.

At a receive end: in a case in which system parameters shown in the following Table 2 are used, $R(d)$ values corresponding to some reception sampling points are obtained through simulation and shown in Table 3.

It should be noted that, when the foregoing simulation is performed, to be close to actuality, at the receive end, 500 noise sampling points are added before the target short training sequence, and therefore, an actual location at which the peak value appears should be the $565^{th}$ point in all sampling points (which include the noise sampling points and the reception sampling points in the target short training sequence).

TABLE 2

| | |
|---|---|
| Bandwidth | 20 MHz |
| MCS | 0 |
| Channel model | AWGN channel model |
| Data length | 100 |
| Antenna quantity | 1 × 1 |
| Equalization | ZF |
| SNR | 10 db |

TABLE 2-continued

| Frequency offset | 0.6690 |
| Target threshold δ | 0.6 |
| Quantity of times of simulation | 1000 times |

TABLE 3

| d | 561 | 562 | 563 | 564 | 565 |
|---|---|---|---|---|---|
| R(d) | 0.5204 | 0.6193 | 0.6611 | 0.8051 | 0.7791 |

A specific process of determining the location of the peak value by the receive-end device is:

1. Determine that the target threshold δ is 0.6 according to the system parameters shown in Table 2.
2. According to the foregoing expression 2, R(d) may be calculated, for example, from the first reception sampling point until $d_0$ that makes $R(d_0) > \delta$ appears, and in this case, record $d_{max} = d_0 = 562$ and $R_{max} = R(d_0) = 0.6193$.

It should be noted that, because the receive-end device performs calculation according to an order of the reception sampling points, the receive-end device actually does not care about specific values of d, and does not need to acquire the specific values of d. Herein, to facilitate understanding of readers, the specific values of d are shown with reference to a specific simulation result; in an actual application, values may be assigned arbitrarily as long as the transmit-end device can distinguish d calculated each time, and repeated descriptions for same or similar cases are omitted in the following.

3. Set $d_1 = d_{max} + 1 = 563$, and calculate $R(d_1) = 0.6611$.
4. Determine a relationship between $R(d_1)$ and $R_{max}$, and because $R(d_1) > R_{max}$, update $d_{max}$ and $R_{max}$, to make $d_{max} = d_1 = 563$ and $R_{max} = R(d_1) = 0.6611$.
5. Set $d_2 = d_{max} + 1 = 564$, and calculate $R(d_2) = 0.8051$.
6. Determine a relationship between $R(d_2)$ and $R_{max}$, and because $R(d_2) > R_{max}$, update $d_{max}$ and $R_{max}$, to make $d_{max} = d_2 = 564$ and $R_{max} = R(d_2) = 0.8051$.
7. Set $d_3 = d_{max} + 1 = 565$, and calculate $R(d_3) = 0.7791$.
8. Determine a relationship between $R(d_3)$ and $R_{max}$, and because $R(d_3) < R_{max}$, determine that the peak value is $R_{max} = 0.8051$ at this time.
9. Use the location of the peak value (in other words, a reception sampling point corresponding to the peak value) as an $(l_0 \cdot N + 1 = 65)^{th}$ sampling point in the target short training sequence, so as to complete initial time synchronization.

A deviation between the foregoing determined theoretical timing point (that is, the $(l_0 \cdot N + 1 = 65)^{th}$ sampling point in the target short training sequence) and a real timing point (a sampling point corresponding to an actual location of the peak value, that is, the $64^{th}$ sampling point in the target short training sequence) is 1, and the theoretical timing point is relatively accurate.

FIG. 3 is a simulation diagram of a relationship between a decision variable R(d) and d in a case in which a system bandwidth is 20 MHz, M=10, N=16, four sub-sequences in the target short training sequence are used for performing AGC processing (that is, $l_0 = 4$), and the quantity of the reception sampling points is $2N \cdot p = 64$ and in a condition of the system parameters shown in Table 2.

As shown in FIG. 3, only one obvious peak value exists in decision variables R(d) that are obtained through correlation processing performed by the receive-end device on the reception sampling points, and a deviation between an actual location of the peak value (in other words, an actual reception sampling point corresponding to the peak value) and a theoretical location of the peak value (in other words, a theoretical reception sampling point corresponding to the peak value) determined through setting of the transmit-end device (specifically, setting of by by the transmit end) is relatively small; therefore, relatively good effects of initial time synchronization can be achieved.

Figure 4:
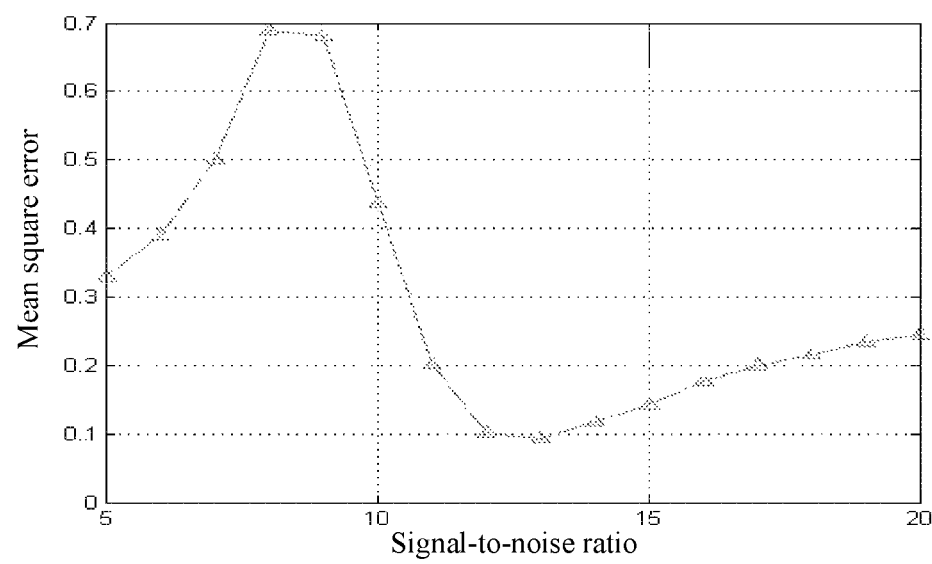
FIG. 4 is a simulation diagram of a relationship between a mean square error and a signal-to-noise ratio according to an embodiment of the present invention.
Figure 5:
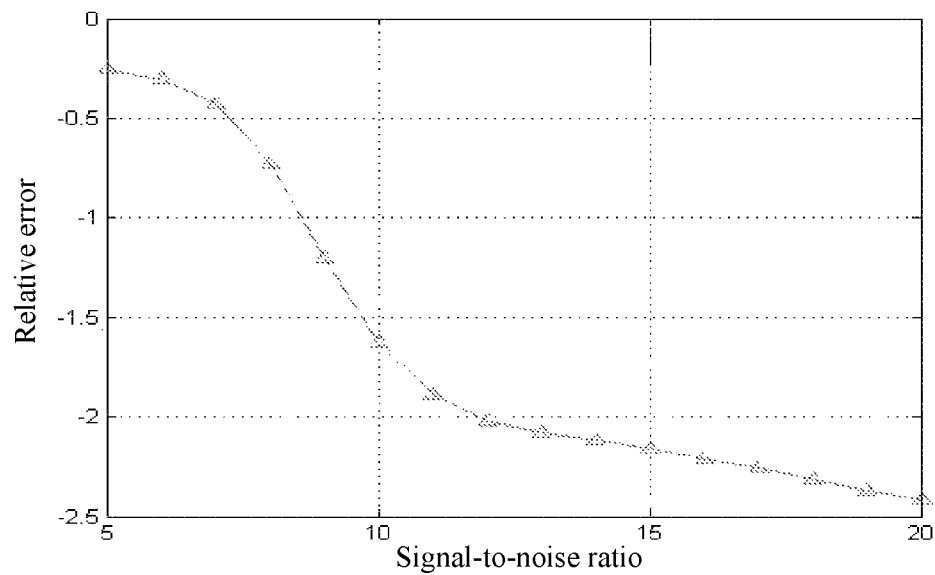
FIG. 5 is a simulation diagram of a relationship between a relative error and a signal-to-noise ratio according to an embodiment of the present invention.

FIG. 4 is a simulation diagram of a relationship between a mean square error and a signal-to-noise ratio in a condition that is the same as that of FIG. 3. FIG. 5 is a simulation diagram of a relationship between a relative error and a signal-to-noise ratio in a condition that is the same as that of FIG. 3. As shown in FIG. 4 and FIG. 5, when a value of the signal-to-noise ratio increases, when corresponding initial time synchronization is performed by using the target short training sequence generated in the signal transmission method of this embodiment of the present invention, changes of the mean square error and the relative error are relatively small, and the initial time synchronization is relatively accurate.

Without loss of generality, in a case in which a system bandwidth is 20 MHz, M=12, N=16, $l_0 = 8$, and the quantity of the reception sampling points is $2N \cdot p = 64$, an effect of the signal transmission method of the present invention is described in the following with reference to a simulation result.

At a transmit end: as described in S110 to S140, in a condition of the foregoing parameters, the symbol sequence generated by the transmit-end device is {1,1,1,−1,1,1,1,−1, 1,1,1,1}, and the target short training sequence generated by the transmit-end device is {b,b,b,−b,b,b,b,−b,b,b,b,b}. Because the transmit-end device sets $l_0 = 8$, according to the setting of the transmit-end device, a location of the peak value that is obtained through correlation processing performed by the receive-end device should appear at the $(8 \times 16 + 1 = 129)^{th}$ point in the target short training sequence.

At a receive end: in a case in which system parameters shown in the foregoing Table 2 are used, R(d) values corresponding to some reception sampling points are obtained through simulation and shown in Table 4.

It should be noted that, when the foregoing simulation is performed, to be close to actuality, at the receive end, 500 noise sampling points are added before the target short training sequence, and therefore, an actual location at which the peak value appears should be the $629^{th}$ point in all sampling points (which include the noise sampling points and the reception sampling points in the target short training sequence).

TABLE 4

| d | 625 | 626 | 627 | 628 | 629 |
|---|---|---|---|---|---|
| R(d) | 0.5381 | 0.6549 | 0.6856 | 0.8109 | 0.8059 |

A specific process of determining the location of the peak value by the receive-end device is:

1. Determine that the target threshold δ is 0.6 according to the system parameters shown in Table 2.
2. According to the foregoing expression 2, R(d) may be calculated, for example, from the first reception sampling point until $d_0$ ($d_0 = 626$) that makes $R(d_0) > \delta$ appears, and in this case, record $d_{max} = d_0 = 626$ and $R_{max} = R(d_0) = 0.6549$.

It should be noted that, because the receive-end device performs calculation according to an order of the reception sampling points, the receive-end device actually does not care about specific values of d, and does not need to acquire the specific values of d. Herein, to facilitate understanding of readers, the specific values of d are shown with reference to a specific simulation result; in an actual application, values may be assigned arbitrarily as long as the transmit-end device can distinguish d calculated each time, and repeated descriptions for same or similar cases are omitted in the following.

3. Set $d_1=d_{max}+1=627$, and calculate $R(d_1)=0.6856$.

4. Determine a relationship between $R(d_1)$ and $R_{max}$, and because $R(d_1)>R_{max}$, update $d_{max}$ and $R_{max}$, to make $d_{max}=d_1=627$ and $R_{max}=R(d_1)=0.6856$.

5. Set $d_2=d_{max}+1=628$, and calculate $R(d_2)=0.8109$.

6. Determine a relationship between $R(d_2)$ and $R_{max}$, and because $R(d_2)>R_{max}$, update $d_{max}$ and $R_{max}$, to make $d_{max}=d_2=628$ and $R_{max}=R(d_2)=0.8109$.

7. Set $d_3=d_{max}+1=629$, and calculate $R(d_3)=0.8059$.

8. Determine a relationship between $R(d_3)$ and $R_{max}$ and because $R(d_3)<R_{max}$, determine that the peak value is $R_{max}=0.8051$ at this time.

9. Use the location of the peak value (in other words, a reception sampling point corresponding to the peak value) as an $(l_0 \cdot N+1=129)^{th}$ sampling point in the target short training sequence, so as to complete initial time synchronization.

A deviation between the foregoing determined theoretical timing point (that is, the $(l_0 \cdot N+1=129)^{th}$ sampling point in the target short training sequence) and a real timing point (a sampling point corresponding to an actual location of the peak value, that is, the $128^{th}$ sampling point in the target short training sequence) is 1, and the theoretical timing point is relatively accurate.

Figure 6:
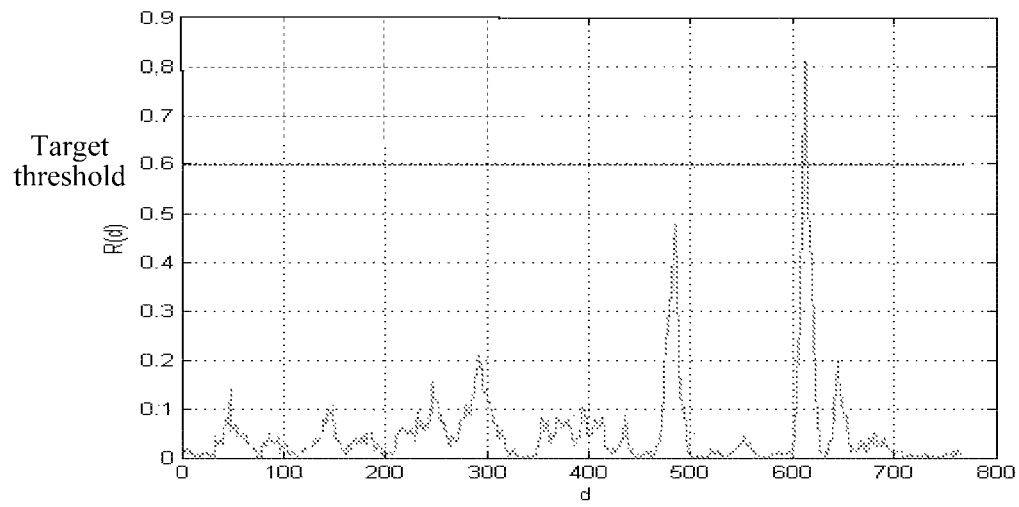
FIG. 6 is a simulation diagram of a relationship between a decision variable R(d) and d according to another embodiment of the present invention.

FIG. 6 is a simulation diagram of a relationship between a decision variable R(d) and d in a case in which a system bandwidth is 20 MHz, $M=12$, $N=16$, to $l_0=8$, and the quantity of the reception sampling points is $2N \cdot p=64$, and in a condition of the system parameters shown in Table 2.

As shown in FIG. 3, only one obvious peak value greater than a target threshold exists in decision variables R(d) that are obtained through the correlation processing performed by the receive-end device on the reception sampling points, and a deviation between an actual location of the peak value (in other words, an actual reception sampling point corresponding to the peak value) and a theoretical location of the peak value (in other words, a theoretical reception sampling point corresponding to the peak value) determined through setting of the transmit-end device (specifically, setting of $l_0$ by the transmit end) is relatively small; therefore, relatively good effects of initial time synchronization can be achieved.

Figure 7:
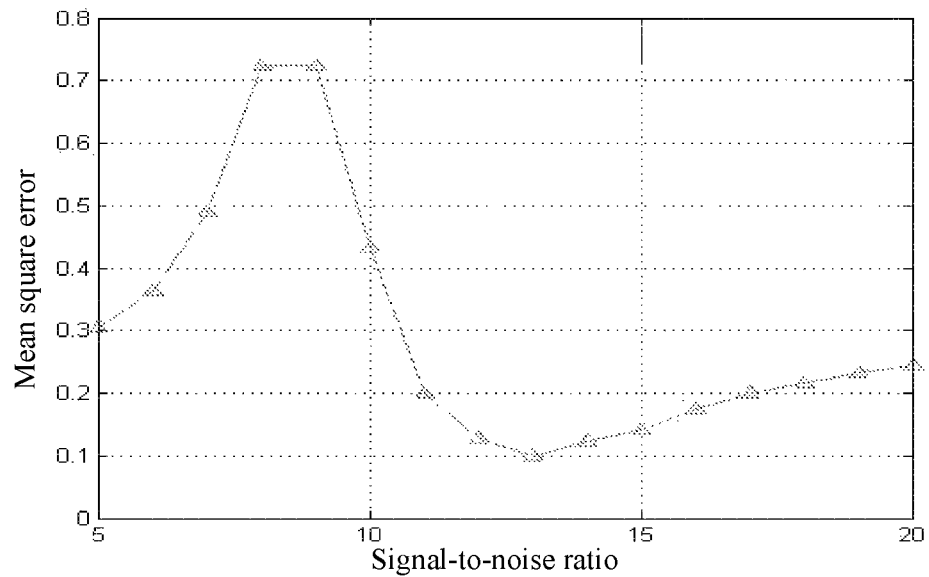
FIG. 7 is a simulation diagram of a relationship between a mean square error and a signal-to-noise ratio according to another embodiment of the present invention.
Figure 8:
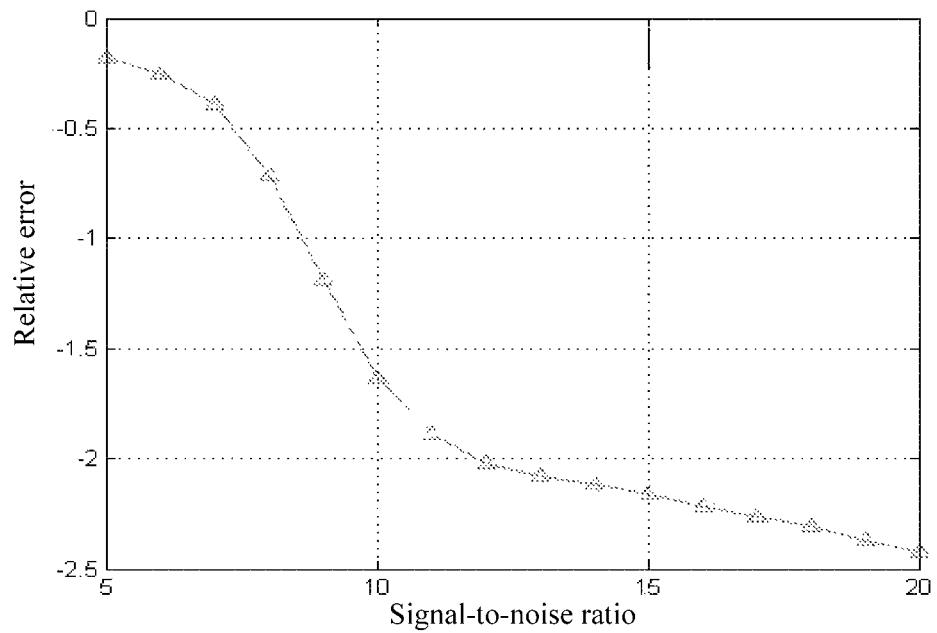
FIG. 8 is a simulation diagram of a relationship between a relative error and a signal-to-noise ratio according to another embodiment of the present invention.

FIG. 7 is a simulation diagram of a relationship between a mean square error and a signal-to-noise ratio in a condition that is the same as that of FIG. 6. FIG. 8 is a simulation diagram of a relationship between a relative error and a signal-to-noise ratio in a condition that is the same as that of FIG. 6. As shown in FIG. 7 and FIG. 8, when a value of the signal-to-noise ratio increases, when corresponding initial time synchronization is performed by using the target short training sequence generated in the signal transmission method of this embodiment of the present invention, changes of the mean square error and the relative error are relatively small, and the initial time synchronization is relatively accurate.

According to the signal transmission method of this embodiment of the present invention, a target short training sequence needing to be sent to a receive-end device is determined by using a quantity of reception sampling points used by the receive-end device when the receive-end device performs correlation processing, so that only one peak value greater than a preset target threshold exists in a processing result obtained through correlation processing that is performed by the receive-end device on the target short training sequence according to a preset rule, so that the receive-end device can perform initial time synchronization according to a location of the peak value, and can implement fast initial time synchronization.

Figure 9:
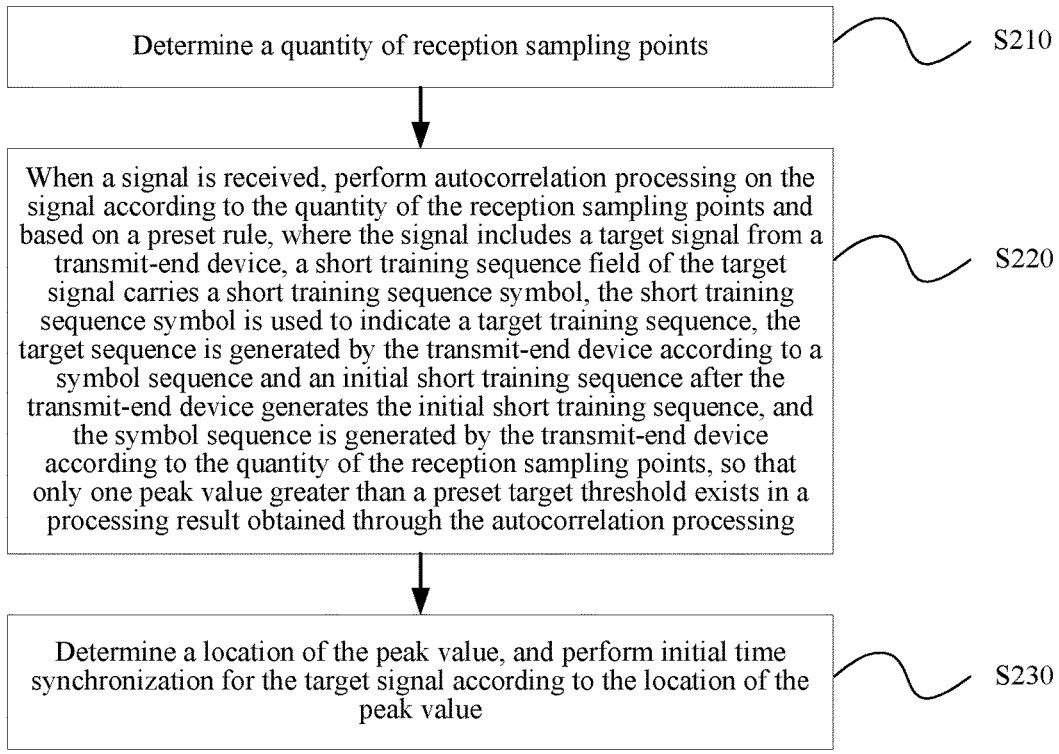
FIG. 9 is a schematic flowchart of a signal transmission method according to another embodiment of the present invention.

FIG. 9 is a schematic flowchart of a signal transmission method 200 according to an embodiment of the present invention described from the perspective of a receive-end device. As shown in FIG. 9, the method 200 includes:

S210: Determine a quantity of reception sampling points.

S220: When a signal is received, perform autocorrelation processing on the signal according to the quantity of the reception sampling points and based on a preset rule, where the signal includes a target signal from a transmit-end device, a short training sequence field of the target signal carries a short training sequence symbol, the short training sequence symbol is used to indicate a target short training sequence, the target sequence is generated by the transmit-end device according to a symbol sequence and an initial short training sequence after the transmit-end device generates the initial short training sequence, and the symbol sequence is generated by the transmit-end device according to the quantity of the reception sampling points, so that only one peak value greater than a preset target threshold exists in a processing result obtained through the correlation processing.

S230: Determine a location of the peak value, and perform initial time synchronization on the target signal according to the location of the peak value.

Specifically, in S210, the receive-end device may determine the quantity of reception sampling points used when performing correlation processing (in other words, correlation operation) on the received signal, where the "quantity of reception sampling points" refers to a quantity of sampling points used when correlation (which includes autocorrelation and cross-correlation) processing is performed on sampling points in the received signal, and for ease of distinguishing, a sampling point in a signal received by a receive end is referred to as a "reception sampling point" in the following. Moreover, a method and process of performing correlation processing on the received signal by the receive end are described in detail later. It should be noted that, in this embodiment of the present invention, to find the peak value, the receive-end device may need to perform correlation processing on the received signal for multiple times according to a receiving order of the reception sampling points, and obtain, in turn, processing values corresponding to multiple reception sampling points, where a quantity of reception sampling points used for each autocorrelation processing is the same.

In this embodiment of the present invention, a specific value of the quantity of the reception sampling points may be preset by a manager, a provider, or the like and stored in a transmit end or a receive end, or may be determined through negotiation by transmit-end and receive-end devices, and the specific value of the quantity of the reception sampling points may be set once and used by default for each transmission, or may change periodically, which is not specifically limited in the present invention.

In S220, the receive-end device may receive a signal, and the signal includes a target signal from the transmit-end device. A process of generating the target signal by the transmit-end device is described in the following.

When needing to send data to the receive-end device, the transmit-end device may generate, based on the following expression 1, the initial short training sequence.

Specifically, an existing communications system provides 64 subcarriers, and sequence numbers of the subcarriers may be −32 to 31. In this embodiment of the present invention, when performing, for example, frequency domain replication, inverse fast Fourier transformation, and normalization processing, the transmit-end device may use subcarriers (in other words, sampling points in subcarriers) whose sequence numbers are −26 to 26, and assign values to the sampling points (which are referred to as transmission sampling points in the following for ease of distinguishing) whose sequence numbers are −26 to 26 according to the expression 1, and add 0 to locations at which sequence numbers are −32 to −27 and 27 to 31, so that a time domain sequence that includes four duplicates of a same sub-sequence is generated after the foregoing frequency domain replication, IFFT, and normalization processing, the sub-sequence is recorded as b, and the time domain sequence is represented as (b,b,b,b), where one sub-sequence includes 16 transmission sampling points. Then, a sequence (b,b,b,b,b) is generated by adding a cyclic prefix of a sub-sequence b, where a quantity of transmission sampling points included in the sequence (b,b,b,b,b) is a length (80 points) of an orthogonal frequency division multiplexing (OFDM, Orthogonal Frequency Division Multiplexing) symbol. Because in addition to being used for frame-start detection and initial time synchronization, a short training sequence is further used for AGC setting, initial frequency offset estimation, and the like, the sequence (b,b,b,b,b) may be duplicated to generate an initial short training sequence (b,b,b,b,b,b,b,b,b,b) that includes 10) sub-sequences b.

It should be noted that, the above-described method of generating an initial short training sequence is merely an exemplary description, and the present invention is not limited thereto, for example, a quantity of sub-sequences included in the initial short training sequence and a quantity of transmission sampling points included in the sub-sequence may be changed arbitrarily, which is not specifically limited in the present invention.

In the following description, for ease of understanding, an example in which the initial short training sequence includes 10 sub-sequences b, that is, $M=10$, and the sub-sequence b includes 16 transmission sampling points, that is $N=16$, is described.

Then, the transmit-end device may determine the quantity of the reception sampling points used by the receive-end device when the receive-end device performs autocorrelation processing (in other words, an autocorrelation operation) on the received signal. In this embodiment of the present invention, a specific value of the quantity of the reception sampling points may be preset by a manager, a provider, or the like and stored in a transmit end or a receive end, or may be determined through negotiation by transmit-end and receive-end devices, and the specific value of the quantity of the reception sampling points may be set once and used by default for each transmission, or may change periodically, which is not specifically limited in the present invention.

Therefore, the transmit-end device may determine the symbol sequence according to the foregoing determined quantity of the reception sampling points, and generate, according to the symbol sequence and the generated initial short training sequence, the target short training sequence that needs to be carried in an L-STF field and to be sent to the receive-end device.

A method of generating the symbol sequence is described first in the following.

Optionally, the symbol sequence is generated by the transmit-end device by solving a target equation set, and the target equation set is generated by setting a target polynomial in a polynomial to be equal to ±p and setting a non-target polynomial in the polynomial to be not equal to ±p, where the polynomial is $a_i \cdot a_{i+p} + a_{i+1} \cdot a_{i+1+p} + \ldots + a_{i+p-1} \cdot a_{i+2p-1}$, $i \in [0, M-2p]$, the quantity of the reception sampling points is $2N \cdot p$, $4 \leq 2p \leq M$, the target polynomial is $a_{l_0} \cdot a_{l_0+p} + a_{l_0+1} \cdot a_{l_0+1+p} + \ldots + a_{l_0+p-1} \cdot a_{l_0 2p-1}$, $l_0$ is a preset integer, and the non-target polynomial is an expression in the polynomial except the target polynomial.

In this embodiment of the present invention, the symbol sequence may be used to determine a symbol of the generated initial short training sequence described above, and therefore, in this embodiment of the present invention, a quantity of elements included in the symbol sequence is equal to a quantity of sub-sequences included in the initial short training sequence. The quantity of the reception sampling points is set to $2N \cdot p$, then a value of p may be determined, and then the polynomial $a_i \cdot a_{i+p} + a_{i+1} \cdot a_{i+1+p} + \ldots + a_{i+p-1} \cdot a_{i+2p-1}$, $i \in [0, M-2p]$ may be determined according to the value of p. Besides, in this embodiment of the present invention, the value of p may be determined according to the determined quantity of the reception sampling points, for example, may be pre-determined according to values of M and N, to satisfy $4 \leq 2p \leq M$, which is not specifically limited in the present invention. For example, in a case in which $M=10$ and $N=16$, a value range of p may be any integer from 2 to 5.

For example, when $p=2$, the foregoing polynomials (a) to (g) may be obtained.

Then, the transmit-end device may determine one target polynomial from the polynomials (a) to (g), and set the target polynomial to be equal to ±p, and set the rest other expressions (that is, non-target polynomials) to be not equal to ±p, so as to form a target equation set; therefore specific values of $a_0 \sim a_9$ can be determined by solving the target equation set, and then the symbol sequence $\{a_0, a_1, a_2, a_3, a_4, a_5, a_6, a_7, a_8, a_9\}$ can be determined.

Besides, in this embodiment of the present invention, the foregoing target polynomial may be randomly selected from the polynomials (a) to (g), which is not specifically limited in the present invention.

It should be noted that, in this embodiment of the present invention, the target polynomial may be represented as $a_{l_0} \cdot a_{l_0+p} + a_{l_0+1} \cdot a_{l_0+1+p} + \ldots + a_{l_0+p-1} \cdot a_{l_0 2p-1}$, $l_0$ may be preset, and a location of $a_{l_0}$ in the symbol sequence, in other words, a location of $a_{l_0} b$ in the target short training sequence may correspond to a location of a peak value obtained through autocorrelation processing that is performed by the receive-end device on a received signal (later, the correspondence is described in detail with reference to processing of the receive-end device), and therefore, $l_0$ may be set in the transmit-end device according to an expected location at which the peak value appears.

Optionally, the target polynomial is determined by the transmit-end device according to a quantity n of the sub-sequences b that are in the target short training sequence and that are used for automatic gain control AGC, where $l_0 > n$.

Specifically, the target short training sequence generated according to the symbol sequence and the initial short training sequence may be used for AGC estimation. Besides, in this embodiment of the present invention, the AGC estimation performed by the receive-end device may be performed between time synchronization and frame-start detection, in other words, a location, of a sub-sequence that is used for the AGC estimation and that is of the target short training sequence, in the target short training sequence may be located before locations, of sub-sequences used for the time synchronization and the frame-start detection, in the target short training sequence. For example, in this embodiment of the present invention, a quantity of sub-sequences, used for the AGC estimation, of the target short training sequence is set to n, and then the AGC estimation may be performed by using sub-sequences $a_0 b$ to $a_{n-1} b$ in the target short training sequence. Therefore, to ensure performing of the time synchronization and the frame-start detection, it is expected that the location of the peak value appears after the sub-sequence $a_{n-1} b$ (specifically, transmission sampling points included in the sub-sequence $a_{n-1} b$) in the target short training sequence, so that in this embodiment of the present invention, when $l_0$ is set, $l_0$ can be enabled. It should be noted that, in a normal case, the quantity of the sub-sequences, used for the AGC estimation, of the target short training sequence may be 4. Therefore, in this embodiment of the present invention, preferably, $l_0 \geq 4$.

As described above, without loss of generality, it is set that M=10, p=2, and $l_0$=4, and the target equation set may be:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}$$

Therefore, the specific values of $a_0 \sim a_9$ may be obtained by solving the equation set, and a group of solutions thereof is:

$$\begin{cases} a_0 = 1 \\ a_1 = 1 \\ a_2 = 1 \\ a_3 = -1 \\ a_4 = 1 \\ a_5 = 1 \\ a_6 = 1 \\ a_7 = 1 \\ a_8 = -1 \\ a_9 = 1 \end{cases}$$

Therefore, a symbol sequence $\{1,1,1,-1,1,1,1,1,-1,1\}$ may be generated, and then a target short training sequence $\{b,b,b,-b,b,b,b,b,-b,b\}$ may be obtained. It can be seen that, last five elements in the symbol sequence are a duplicate of first five elements. Therefore, when the symbol sequence or the target short training sequence is actually generated, just first five sub-sequences are generated, and the five sub-sequences are duplicated, and then the symbol sequence or the target short training sequence can be generated, which can further improve processing efficiency.

It should be understood that, the above-described symbol sequence, in other words, specific values of $a_0 \sim a_9$ is merely an exemplary description, and the present invention is not limited thereto. After the foregoing target equation set is solved, multiple groups of solutions can be obtained, and the objective of the present invention can be achieved by using any group of solutions, that is, the solutions can be selected randomly for use.

Besides, the above-described specific values of parameters are merely an exemplary description, and the present invention is not limited thereto. For example, when p=3, the polynomials may be represented as:

$a_0 \cdot a_3 + a_1 \cdot a_4 + a_2 \cdot a_5$;

$a_1 \cdot a_4 + a_2 \cdot a_5 + a_3 \cdot a_6$;

$a_2 \cdot a_5 + a_3 \cdot a_6 + a_4 \cdot a_7$;

$a_3 \cdot a_6 + a_4 \cdot a_7 + a_5 \cdot a_8$; and $a_4 \cdot a_7 + a_5 \cdot a_8 + a_6 \cdot a_9$.

Correspondingly, it is set that M=10, p=3, and $l_0$=4, and the target equation set may be:

$$\begin{cases} a_0 \cdot a_3 + a_1 \cdot a_4 + a_2 \cdot a_5 \neq \pm 3 \\ a_1 \cdot a_4 + a_2 \cdot a_5 + a_3 \cdot a_6 \neq \pm 3 \\ a_2 \cdot a_5 + a_3 \cdot a_6 + a_4 \cdot a_7 \neq \pm 3 \\ a_3 \cdot a_6 + a_4 \cdot a_7 + a_5 \cdot a_8 \neq \pm 3 \\ a_4 \cdot a_7 + a_5 \cdot a_8 + a_6 \cdot a_9 = \pm 3 \end{cases}$$

After the target short training sequence is generated as described above, the transmit-end device may add, to the short training sequence field of the target signal (specifically, at a physical layer of the target signal) that needs to be sent to the receive-end device, the short training sequence symbol used to indicate the target short training sequence, and send the target signal to the receive-end device.

It should be noted that, as an example but not a limitation, in this embodiment of the present invention, the short training sequence symbol may be a symbol of an analog signal that is generated by the transmit-end device by performing digital-to-analog conversion processing, up-conversion processing, filtering processing, or the like on the foregoing target short training sequence.

Besides, the above-described values of M, N, p, and $l_0$ are merely an exemplary description, and the present invention is not limited thereto; the values may be set arbitrarily as long as the polynomial $a_i \cdot a_{i+p} + a_{i+1} \cdot a_{i+1+p} + \ldots + a_{i+p-1} \cdot a_{i+2p-1}$, where $i \in [0, M-2p]$ is satisfied.

Go back to S220, it is assumed that the signal (specifically, a sampling value of the received signal, and the sampling value is a complex number and include a real component and an imaginary component) received by the receive-end device is r, where the signal r includes noise and the target signal from the transmit-end device. In this embodiment of the present invention, the foregoing determined target short training sequence may be used to enable the receive-end device to complete initial time synchronization on the target signal.

Optionally, the performing autocorrelation processing on a signal according to the quantity of the reception sampling points and based on a preset rule includes: performing autocorrelation processing on the target signal according to the following formula:

$$R(d) = \frac{\left( \sum_{k=d}^{d+Np-1} r_k r_{k+Np}^* \right)^2}{\left( \sum_{k=d}^{d+Np-1} |r_k|^2 \right) \cdot \left( \sum_{k=d}^{d+Np-1} |r_{k+Np}|^2 \right)},$$

where N is a quantity of transmission sampling points included in a sub-sequence b, r represents a sampling value of the received signal, the quantity of the reception sampling points is 2N·p, and d represents an initial reception sampling point used for the correlation processing.

Specifically, in this embodiment of the present invention, the receive-end device may define the following decision variable R(d), and perform initial time synchronization according to R(d).

As described above, when the foregoing determined quantity of the reception sampling points is represented as 2N·p, the receive-end device may perform in turn, based on the following expression 2, autocorrelation processing (in other words, an autocorrelation operation) on multiple reception sampling points, to obtain multiple processing values:

$$R(d) = \frac{\left(\sum_{k=d}^{d+Np-1} r_k r_{k+Np}^*\right)^2}{\left(\sum_{k=d}^{d+Np-1} |r_k|^2\right) \cdot \left(\sum_{k=d}^{d+Np-1} |r_{k+Np}|^2\right)}.$$ 
Expression 2 d represents an initial reception sampling point used for correlation processing performed once. In this embodiment of the present invention, an initial value of d is 1, and thereafter, each time correlation processing is performed, 1 is added to d in turn, that is, a processing value obtained through correlation processing of the first time is a processing value R(1) corresponding to the first reception sampling point, a processing value obtained through correlation processing of the second time is a processing value R(2) corresponding to the second reception sampling point, and so on, until the peak value is found.

$$\sum_{k=d}^{d+Np-1} r_k r_{k+Np}^*$$

represents an autocorrelation function of 2N·p points that start from the reception sampling point d.

$$\sum_{k=d}^{d+Np-1} |r_k|^2$$

represents an energy value of first N·p points in the 2N·p points.

$$\sum_{k=d}^{d+Np-1} |r_{k+Np}|^2$$

represents an energy value of last N·p points in the 2N·p points.

In a case in which noise is neglected, it can be known from Cauchy inequality that: only when there is a complex number $\lambda$ that makes $r_k = \lambda r_{k+Np}$ true for arbitrary $d \leq k \leq d+Np-1$, R(d) reaches the peak value.

In this embodiment of the present invention, because the transmit-end device determines the target polynomial $a_{l_0} \cdot a_{l_0+p} + a_{l_0+1} \cdot a_{l_0+1+p} + \ldots + a_{l_0+p-1} \cdot a_{l_0 2p-1} = \pm p$, and makes the non-target polynomial not equal to $\pm p$, it can be ensured that the complex number $\lambda$ and an unique positive integer $l_0$ exist, where $d = l_0 \cdot N + 1$, and $r_k = \lambda r_{k+NP}$ is true for arbitrary $d \leq k \leq d+Np-1$.

Therefore, it can be ensured that only one peak value greater than a preset target threshold $\delta$ exists in R(d) obtained through the foregoing correlation processing by the receive-end device. It should be noted that, in this embodiment of the present invention, the receive-end device may determine the target threshold $\delta$ in a manner such as pre-testing or simulation.

Optionally, the determining a location of the peak value includes:

determining the location of the peak value according to the target threshold, where the peak value is greater than the target threshold.

Specifically, near the peak value of R(d), when $d \leq l_0 \cdot N$, with the increase of a value of d, a value of R(d) tends to increase, and when $d > l_0 \cdot N$, with the increase of the value of d, the value of R(d) tends to decrease; therefore, in this embodiment of the present invention, the receive-end device may perform the following operations by using a property that the target threshold $\delta$ and R(d) first increase and then decrease near the peak value, to find the location of the peak value.

In this embodiment of the present invention, time delay may be performed according to system parameters (such as a bandwidth, a modulation and coding scheme (MCS, Modulation and Coding Scheme), a channel model, a data length, an antenna quantity, equalization, frequency offset, and the like), so that target thresholds $\delta$ in different system parameters are obtained, and in an actual signal receiving process, a corresponding target thresholds $\delta$ may be selected according to currently used system parameters.

The foregoing Table 1 gives an example of a correspondence between the system parameters and the target threshold $\delta$.

A processing process of determining the peak value by the receive-end device is:

1. Determine the target threshold according to the currently used system parameters.

2. Calculate, according to the foregoing expression 2 and according to an arrangement order of the reception sampling points, in turn R(d) values corresponding to reception sampling) points, until $d_0$ that makes $R(d_0) > \delta$ appears, and in this case, record $d_{max} = d_0$ and $R_{max} = R(d_0)$.

3. Set $d_1 = d_{max} + 1$, and calculate $R(d_1)$.

4. Determine a relationship between $R(d_1)$ and $R_{max}$, and if $R(d_1) > R_{max}$, update $d_{max}$ and $R_{max}$, to make $d_{max} = d_1$ and $R_{max} = R(d_1)$, and go back to step 3; or if $R(d_1) < R_0$, go to step 5.

Therefore, in S230, the receive-end device may use the location of the peak value (in other words, a reception sampling point corresponding to the peak value) as an $(l_0 \cdot N+1)^{th}$ sampling point in the target short training sequence, so as to complete initial time synchronization. That is, the performing initial time synchronization on the target signal according to the location of the peak value includes:

determining that the location of the peak value is an $(l_0 \cdot N+1)^{th}$ point in the target short training sequence.

It should be understood that, the above-described manner of performing initial time synchronization on the target signal according to the location of the peak value by the receive-end device is merely an exemplary description, and the present invention is not limited thereto. For example, due to impact of noise, after a timing point (the reception sampling point corresponding to the location of the peak value) of the initial time synchronization is obtained, proper adjustment may be performed, for example, reception sampling points of a preset quantity (for example, two) are rolled back, so that the timing point falls within a range of a cyclic prefix of an OFDM symbol. In other words, the location of the peak value may also be determined as an $(l_0 \cdot N+1+\Delta)^{th}$ point in the target short training sequence, where $\Delta$ may be positive or negative, and may be pre-determined according to, for example, a noise condition.

According to the method of this embodiment of the present invention, it is only needed to find the location of the peak value to complete initial time synchronization; while in the prior art, autocorrelation and cross-correlation operations for an entire short training sequence need to be completed to obtain a falling edge of the foregoing platform, so as to complete initial time synchronization. Obviously, processing complexity of this embodiment of the present invention is lower.

It should be understood that, the above-described method of determining the location of the peak value by the receive-end device is merely an exemplary description, and the present invention is not limited thereto. For example, the foregoing target threshold $\delta$ may not be used, but comparison is directly performed on processing values of correlation processing that are obtained through calculation and that correspond to the reception sampling points, so as to determine the location of the peak value.

Without loss of generality, in a case in which a system bandwidth is 20 MHz, M=10, N=16, four sub-sequences in the target short training sequence are used for performing AGC processing (that is, $l_0$=4), and the quantity of the reception sampling points is 2N·p=64, an effect of the signal transmission method of the present invention is described in the following with reference to a simulation result.

At a transmit end: as described in S110 to S140, in a condition of the foregoing parameters, the symbol sequence generated by the transmit-end device is {1,1,1,−1,1,1,1,1,−1,1} and the target short training sequence generated by the transmit-end device is {b,b,b,−b,b,b,b,b,−b,b}. Because the transmit-end device sets $l_0$=4, according to the setting of the transmit-end device, a location of the peak value that is obtained through correlation processing performed by the receive-end device should appear at the $(4 \times 16+1=65)^{th}$ point in the target short training sequence.

At a receive end: in a case in which system parameters shown in the foregoing Table 2 are used, R(d) values corresponding to some reception sampling points are obtained through simulation and shown in Table 3.

It should be noted that, when the foregoing simulation is performed, to be close to actuality, at the receive end, 500 noise sampling points are added before the target short training sequence, and therefore, an actual location at which the peak value appears should be the $565^{th}$ point in all sampling points (which include the noise sampling points and the reception sampling points in the target short training sequence).

A specific process of determining the location of the peak value by the receive-end device is:

1. Determine that the target threshold $\delta$ is 0.6 according to the system parameters shown in Table 2.

2. According to the foregoing expression 2, R(d) may be calculated, for example, from the first reception sampling point until $d_0$ that makes $R(d_0)>\delta$ appears, and in this case, record $d_{max}=d_0=562$ and $R_{max}=R(d_0)=0.6193$.

It should be noted that, because the receive-end device performs calculation according to an order of the reception sampling points, the receive-end device actually does not care about specific values of d, and does not need to acquire the specific values of d. Herein, to facilitate understanding of readers, the specific values of d are shown with reference to a specific simulation result; in an actual application, values may be assigned arbitrarily as long as the transmit-end device can distinguish d calculated each time, and repeated descriptions for same or similar cases are omitted in the following.

3. Set $d_1=d_{max}+1=563$, and calculates $R(d_1)=0.6611$.

4. Determine a relationship between $R(d_1)$ and $R_{max}$, and because $R(d_1)>R_{max}$, update $d_{max}$ and $R_{max}$, to make $d_{max}=d_1=563$ and $R_{max}=R(d_1)=0.6611$.

5. Set $d_2=d_{max}+1=564$, and calculate $R(d_2)=0.8051$.

6. Determine a relationship between $R(d_2)$ and $R_{max}$, and because $R(d_2)>R_{max}$, update $d_{max}$ and $R_{max}$, to make $d_{max}=d_2=564$ and $R_{max}=R(d_2)=0.8051$.

7. Set $d_3=d_{max}+1=565$, and calculate $R(d_3)=0.7791$.

8. Determine a relationship between $R(d_3)$ and because $R(d_3)<R_{max}$, determine that the peak value is $R_{max}=0.8051$ at this time.

Therefore, the location of the peak value (in other words, a reception sampling point corresponding to the peak value) may be used as an $(l_0 \cdot N+1=65)^{th}$ sampling point in the target short training sequence, so as to complete initial time synchronization.

A deviation between the foregoing determined theoretical timing point (that is, the $(l_0 \cdot N+1=65)^{th}$ sampling point in the target short training sequence) and a real timing point (a sampling point corresponding to an actual location of the peak value, that is, the $64^{th}$ sampling point in the target short training sequence) is 1, and the theoretical timing point is relatively accurate.

FIG. 3 is a simulation diagram of a relationship between a decision variable R(d) and d in a case in which a system bandwidth is 20 MHz, M=10, N=16 four sub-sequences in the target short training sequence are used for performing AGC processing (that is, $l_0$=4), and the quantity of the reception sampling points is 2N·p=64, and in a condition of the system parameters shown in Table 2.

As shown in FIG. 3, only one obvious peak value exists in decision variables R(d) that are obtained through the correlation processing performed by the receive-end device on the reception sampling points, and a deviation between an actual location of the peak value (in other words, an actual reception sampling point corresponding to the peak value) and a theoretical location of the peak value (in other words, a theoretical reception sampling point corresponding to the peak value) determined through setting of the transmit-end device (specifically, setting of $l_0$ by the transmit end) is relatively small; therefore, relatively good effects of initial time synchronization can be achieved.

FIG. 4 is a simulation diagram of a relationship between a mean square error and a signal-to-noise ratio in a condition that is the same as that of FIG. 3. FIG. 5 is a simulation diagram of a relationship between a relative error and a signal-to-noise ratio in a condition that is the same as that of FIG. 3. As shown in FIG. 4 and FIG. 5, when a value of the signal-to-noise ratio increases, when corresponding initial time synchronization is performed by using the target short training sequence generated in the signal transmission method of this embodiment of the present invention, changes of the mean square error and the relative error are relatively small, and the initial time synchronization is relatively accurate.

Without loss of generality, in a case in which a system bandwidth is 20 MHz, M=12, N=16, $l_0$=8, and the quantity of the reception sampling points is 2N·p=64, an effect of the signal transmission method of the present invention is described in the following with reference to a simulation result.

At a transmit end: as described in S110 to S140, in a condition of the foregoing parameters, the symbol sequence generated by the transmit-end device is {1,1,1,−1,1,1,1,−1, 1,1,1,1}, and the target short training sequence generated by the transmit-end device is {b,b,b,−b,b,b,b,−b,b,b,b,b,}. Because the transmit-end device sets $l_0$=8, according to the setting of the transmit-end device, a location of the peak value that is obtained through correlation processing performed by the receive-end device should appear at the $(8\times16+1=129)^{th}$ point in the target short training sequence.

At a receive end: in a case in which system parameters shown in the foregoing Table 2 are used, R(d) values corresponding to some reception sampling points are obtained through simulation and shown in Table 4.

It should be noted that, when the foregoing simulation is performed, to be close to actuality, at the receive end, 500 noise sampling points are added before the target short training sequence, and therefore, an actual location at which the peak value appears should be the $629^{th}$ point in all sampling points (which include the noise sampling points and the reception sampling points in the target short training sequence).

A specific process of determining the location of the peak value by the receive-end device is:

1. Determine that the target threshold δ is 0.6 according to the system parameters shown in Table 2.

2. According to the foregoing expression 2, R(d) may be calculated, for example, from the first reception sampling point until $d_0$ ($d_0$=626) that makes R(d)>δ appears, and in this case, record $d_{max}=d_0=626$ and $R_{max}=R(d_0)=0.6549$.

It should be noted that, because the receive-end device performs calculation according to an order of the reception sampling points, the receive-end device actually does not care about specific values of d, and does not need to acquire the specific values of d. Herein, to facilitate understanding of readers, the specific values of d are shown with reference to a specific simulation result; in an actual application, values may be assigned arbitrarily as long as the transmit-end device can distinguish d calculated each time, and repeated descriptions for same or similar cases are omitted in the following.

3. Set $d_1=d_{max}+1=627$, and calculate $R(d_1)=0.6856$.

4. Determine a relationship between $R(d_1)$ and $R_{max}$, and because $R(d_1)>R_{max}$, update $d_{max}$ and $R_{max}$, to make $d_{max}=d_1=627$, and $R_{max}=R(d_1)=0.6856$.

5. Set $d_2=d_{max}+1=628$, and calculate $R(d_2)=0.8109$.

6. Determine a relationship between $R(d_2)$ and $R_{max}$ and because $R(d_2)>R_{max}$, update $d_{max}$ and $R_{max}$, to make $d_{max}=d_2=628$ and $R_{max}=R(d_2)=0.8109$.

7. Set $d_3=d_{max}+1=629$, and calculate $R(d_3)=0.8059$.

8. Determine a relationship between $R(d_3)$ and $R_{max}$, and because $R(d_3)<R_{max}$, determine that the peak value is $R_{max}=0.8051$ at this time.

Therefore, the location of the peak value (in other words, a reception sampling point corresponding to the peak value) is used as an $(l_0 \cdot N+1=129)^{th}$ sampling point in the target short training sequence, so as to complete initial time synchronization.

A deviation between the foregoing determined theoretical timing point (that is, the $l_0 \cdot N+1=129)^{th}$ sampling point in the target short training sequence) and a real timing point (a sampling point corresponding to an actual location of the peak value, that is, the $128^{th}$ sampling point in the target short training sequence) is 1, and the theoretical timing point is relatively accurate.

FIG. 6 is a simulation diagram of a relationship between a decision variable R(d) and d in a case in which a system bandwidth is 20 MHz, M=12, N=16, to $l_0$=8, and the quantity of the reception sampling points is 2N·p=64, and in a condition of the system parameters shown in Table 2.

As shown in FIG. 3, only one obvious peak value exists in decision variables R(d) that are obtained through the correlation processing performed by the receive-end device on the reception sampling points, and a deviation between an actual location of the peak value (in other words, an actual reception sampling point corresponding to the peak value) and a theoretical location of the peak value (in other words, a theoretical reception sampling point corresponding to the peak value) determined through setting of the transmit-end device (specifically, setting of by by the transmit end) is relatively small; therefore, relatively good effects of initial time synchronization can be achieved.

FIG. 7 is a simulation diagram of a relationship between a mean square error and a signal-to-noise ratio in a condition that is the same as that of FIG. 6. FIG. 8 is a simulation diagram of a relationship between a relative error and a signal-to-noise ratio in a condition that is the same as that of FIG. 6. As shown in FIG. 7 and FIG. 8, when a value of the signal-to-noise ratio increases, when corresponding initial time synchronization is performed by using the target short training sequence generated in the signal transmission method of this embodiment of the present invention, changes of the mean square error and the relative error are relatively small, and the initial time synchronization is relatively accurate.

According to the signal transmission method of this embodiment of the present invention, a target short training sequence needing to be sent to a receive-end device is determined by using a quantity of reception sampling points used by the receive-end device when the receive-end device performs correlation processing, so that only one peak value greater than a preset target threshold exists in a processing result obtained through correlation processing that is performed by the receive-end device on the target short training sequence according to a preset rule, so that the receive-end device can perform initial time synchronization according to a location of the peak value, and can implement fast initial time synchronization.

The signal transmission methods of the embodiments of the present invention are described above in detail with reference to FIG. 1 to FIG. 9, and signal transmission apparatuses of the embodiments of the present invention are described in the following in detail with reference to FIG. 10 and FIG. 11.

Figure 10:
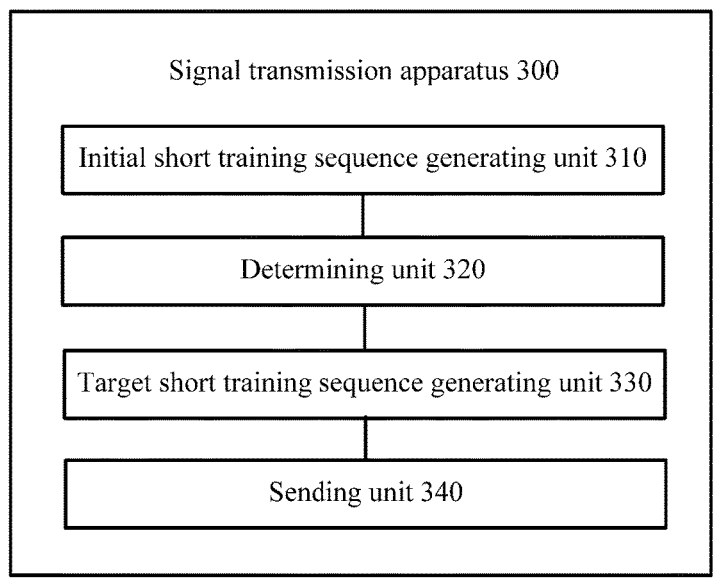
FIG. 10 is a schematic block diagram of a signal transmission apparatus according to an embodiment of the present invention.

FIG. 10 shows a signal transmission apparatus 300 of an embodiment of the present invention. As shown in FIG. 10, the apparatus 300 includes:

an initial short training sequence generating unit 310, configured to generate an initial short training sequence, where the initial short training sequence includes subsequences b, and the sub-sequence b includes N transmission sampling points;

a determining unit 320, configured to determine a quantity of reception sampling points used by a receive-end device when the receive-end device performs autocorrelation processing;

a target short training sequence generating unit 330, configured to generate a symbol sequence according to the quantity of the reception sampling points, where the symbol sequence is represented as $\{a_0, a_1, \ldots, a_i, \ldots, a_{K-1}\}$, and generate a target short training sequence according to the symbol sequence and the initial short training sequence, where the target short training sequence is represented as $\{a_0 b, a_1 b, \ldots, a_i b, \ldots, a_{K-1} b\}$, so that only one peak value greater than a preset target threshold exists in a processing result obtained through correlation processing that is performed by the receive-end device on the target short training sequence according to a preset rule; and a sending unit, configured to send a target signal to the receive-end device, where a short training sequence field of the target signal carries a short training sequence symbol, and the short training sequence symbol is used to indicate the target short training sequence.

Optionally, the target short training sequence generating unit 330 is specifically configured to: determine, according to the quantity of the reception sampling points, a polynomial $a_i \cdot a_{i+p} + a_{i+1} \cdot a_{i+1+p} + \ldots + a_{i+p-1} \cdot a_{i+2p-1}$, $i \in [0, M-2p]$, where the quantity of the reception sampling points is $2N \cdot p$, and $4 \leq 2p \leq M$;

determine a target polynomial $a_{l_0} \cdot a_{l_0+p} + a_{l_0+1} \cdot a_{l_0+1+p} + \ldots + a_{l_0+p-1} \cdot a_{l_0 2p-1}$, where $l_0$ is a preset integer;

set the target polynomial to be equal to $\pm p$, and set a non-target polynomial to be not equal to $\pm p$, to generate a target equation set, where the non-target polynomial is an expression in the polynomial except the target polynomial; and solve the target equation set, to generate the symbol sequence.

Optionally, the target short training sequence generating unit 330 is specifically configured to determine the target polynomial according to a quantity n of the sub-sequences b that are in the target short training sequence and that are used for automatic gain control AGC, to satisfy $l_0 \geq n$.

Optionally, $M=10$, $p=2$, $l_0=4$, and the target equation set is:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}$$

Optionally, the symbol sequence is $\{1,1,1,-1,1,1,1,1,-1,1\}$, and the target short training sequence is $\{b,b,b,-b,b,b,b,b,-b,b\}$.

The signal transmission apparatus 300 according to this embodiment of the present invention may correspond to the transmit-end device in the method in the embodiments of the present invention; moreover, units and modules in the data transmission apparatus 300 and the foregoing other operations and/or functions are respectively for implementing corresponding procedures in the method 100 in FIG. 2, and to be concise, details are not described herein again.

According to the signal transmission apparatus of this embodiment of the present invention, a target short training sequence needing to be sent to a receive-end device is determined by using a quantity of reception sampling points used by the receive-end device when the receive-end device performs correlation processing, so that only one peak value greater than a preset target threshold exists in a processing result obtained through correlation processing that is performed by the receive-end device on the target short training sequence according to a preset rule, so that the receive-end device can perform initial time synchronization according to a location of the peak value, and can implement fast initial time synchronization.

Figure 11:
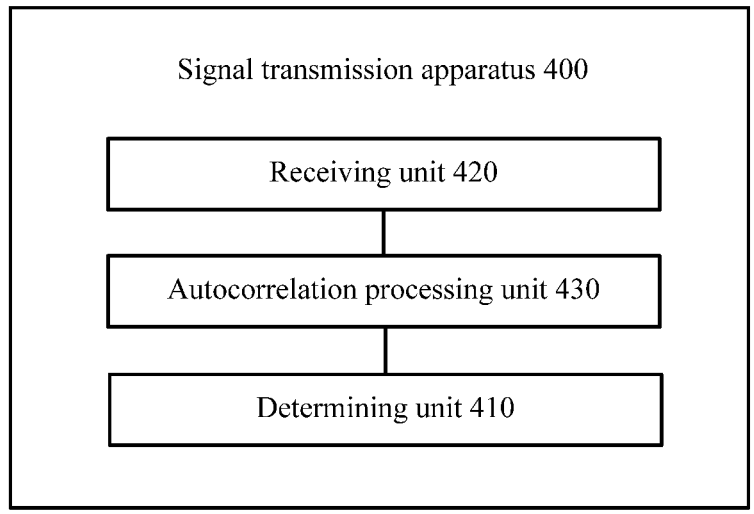
FIG. 11 is a schematic block diagram of a signal transmission apparatus according to another embodiment of the present invention.

FIG. 11 shows a signal transmission apparatus 400 of an embodiment of the present invention. As shown in FIG. 11, the apparatus 400 includes:

a determining unit 410, configured to determine a quantity of reception sampling points;

a receiving unit 420, configured to receive a signal; and an autocorrelation processing unit 430, configured to perform autocorrelation processing on the signal according to the quantity of the reception sampling points and based on a preset rule, where the signal includes a target signal from a transmit-end device, a short training sequence field of the target signal carries a short training sequence symbol, the short training sequence symbol is used to indicate a target short training sequence, the target sequence is generated by the transmit-end device according to a symbol sequence and an initial short training sequence after the transmit-end device generates the initial short training sequence, and the symbol sequence is generated by the transmit-end device according to the quantity of the reception sampling points, so that only one peak value greater than a preset target threshold exists in a processing result obtained through the autocorrelation processing; and the determining unit 410 is further configured to determine a location of the peak value, and perform initial time synchronization on the target signal according to the location of the peak value.

Optionally, the autocorrelation processing unit 430 is specifically configured to perform autocorrelation processing on the target signal according to the following formula:

$$R(d) = \frac{\left(\sum_{k=d}^{d+Np-1} r_k r_{k+Np}^*\right)^2}{\left(\sum_{k=d}^{d+Np-1} |r_k|^2\right) \cdot \left(\sum_{k=d}^{d+Np-1} |r_{k+Np}|^2\right)},$$

where N is a quantity of transmission sampling points included in a sub-sequence b, r represents a sampling value of the received signal, the quantity of the reception sampling points is $2N \cdot p$, and d represents an initial reception sampling point used for the correlation processing.

Optionally, the determining unit 410 is specifically configured to determine the location of the peak value according to the preset target threshold.

Optionally, the symbol sequence is generated by the transmit-end device by solving a target equation set, and the target equation set is generated by setting a target polynomial in a polynomial to be equal to $\pm p$ and setting a non-target polynomial in the polynomial to be not equal to $\pm p$, where the polynomial is $a_i \cdot a_{i+p} + a_{i+1} \cdot a_{i+1+p} + \ldots + a_{i+p-1} \cdot a_{i+2p-1}$, $i \in [0, M-2p]$, the quantity of the reception sampling points is $2N \cdot p$, the target polynomial is $a_{l_0} \cdot a_{l_0+p} + a_{l_0+1} \cdot a_{l_0+1+p} + \ldots + a_{l_0+p-1} \cdot a_{l_0 2p-1}$, $l_0$ is a preset integer, and the non-target polynomial is an expression in the polynomial except the target polynomial.

Optionally, the target polynomial is determined by the transmit-end device according to a quantity n of the sub-sequences b that are in the target short training sequence and that are used for automatic gain control AGC, where $l_0 \geq n$.

Optionally, M=10, p=2, to $l_0$=4, and the target equation set is:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}$$

Optionally, the symbol sequence is {1,1,1,−1,1,1,1,1,−1,1} and the target short training sequence is {b,b,b,−b,b,b,b,b,−b,b}.

Optionally, the determining unit 410 is specifically configured to determine that the location of the peak value is an $(l_0 \cdot N+1)^{th}$ point in the target short training sequence.

The data transmission apparatus 400 according to this embodiment of the present invention may correspond to the receive-end device in the method in the embodiments of the present invention; moreover, units and modules in the data transmission apparatus 400 and the foregoing other operations and/or functions are respectively for implementing corresponding procedures in the method 200 in FIG. 9, and to be concise, details are not described herein again.

According to the signal transmission apparatus of this embodiment of the present invention, a target short training sequence needing to be sent to a receive-end device is determined by using a quantity of reception sampling points used by the receive-end device when the receive-end device performs correlation processing, so that only one peak value greater than a preset target threshold exists in a processing result obtained through correlation processing that is performed by the receive-end device on the target short training sequence according to a preset rule, so that the receive-end device can perform initial time synchronization according to a location of the peak value, and can implement fast initial time synchronization.

The signal transmission methods of the embodiments of the present invention are described above in detail with reference to FIG. 1 to FIG. 9, and signal transmission devices of the embodiments of the present invention are described in the following in detail with reference to FIG. 12 and FIG. 13.

Figure 12:
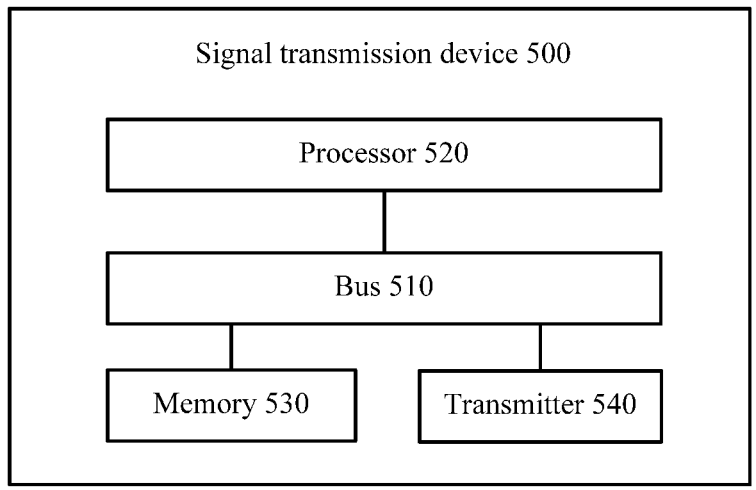
FIG. 12 is a schematic structural diagram of a signal transmission device according to an embodiment of the present invention.

FIG. 12 shows a signal transmission device 500 of an embodiment of the present invention. As shown in FIG. 12, the device 500 includes:

a bus 510;

a processor 520 connected to the bus 510;

a memory 530 connected to the bus 510; and a transmitter 540 connected to the bus 510.

The processor 520 invokes, by using the bus 510, a program stored in the memory 530 to generate an initial short training sequence, where the initial short training sequence includes M sub-sequences b, and the sub-sequence b includes N transmission sampling points;

determine a quantity of reception sampling points used by a receive-end device when the receive-end device performs correlation processing;

generate a symbol sequence according to the quantity of the reception sampling points, where the symbol sequence is represented as {$a_0, a_1, \ldots, a_i, \ldots, a_{K-1}$}, and generate a target short training sequence according to the symbol sequence and the initial short training sequence, where the target short training sequence is represented as {$a_0 b, a_1 b, \ldots, a_i b, \ldots, a_{K-1} b$}, so that only one peak value greater than a preset target threshold exists in a processing result obtained through autocorrelation processing that is performed by the receive-end device on the target short training sequence according to a preset rule; and control the transmitter 540 to send a target signal to the receive-end device, where a short training sequence field of the target signal carries a short training sequence symbol, and the short training sequence symbol is used to indicate the target short training sequence.

Optionally, the processor 520 is specifically configured to: determine, according to the quantity of the reception sampling points, a polynomial $a_i \cdot a_{i+p} + a_{i+1} \cdot a_{i+1+p} + \ldots + a_{i+p-1} \cdot a_{i+2p-1}$, $i \in [0, M-2p]$, where the quantity of the reception sampling points is $2N \cdot p$, and $4 \leq 2p \leq M$;

determine a target polynomial $a_{l_0} \cdot a_{l_0+p} + a_{l_0+1} \cdot a_{l_0+1+p} + \ldots + a_{l_0+p-1} \cdot a_{l_0 2p-1}$, where $l_0$ is a preset integer;

set the target polynomial to be equal to ±p, and set a non-target polynomial to be not equal to ±p, to to generate a target equation set, where the non-target polynomial is an expression in the polynomial except the target polynomial; and solve the target equation set, to generate the symbol sequence.

Optionally, the processor 520 is specifically configured to determine the target polynomial according to a quantity n of the sub-sequences b that are in the target short training sequence and that are used for automatic gain control AGC, to satisfy $l_0 \geq n$.

Optionally, M=10, p=2, $l_0$=4, and the target equation set is:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}$$

Optionally, the symbol sequence is {1,1,1,−1,1,1,1,1,−1,1}, and the target short training sequence is {b,b,b,b,b,b,b,b,b,b}.

In this embodiment of the present invention, the processor may also be referred to as a CPU. The memory may include a read-only memory and a random access memory, and provides an instruction and a signal to the processor. A part of the memory may further include a non-volatile random access memory (NVRAM). In a specific application, a signal transmission device may be embedded into or may be, for example, a standard Ethernet communications device such as a personal computer, and modules of the signal transmission device are coupled together by using a bus system. Besides including a signal bus, the bus system further includes a power bus, a control bus, and a status signal bus.

The processor may implement or perform steps and logical block diagrams disclosed in the method embodiments of the present invention. A general-purpose processor may be a microprocessor or the processor may be any conventional processor, decoder, and the like. With reference to the methods disclosed in the embodiments of the present invention, steps may be represented directly as being implemented by a hardware processor, or implemented by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and a decoding unit or processing unit reads information in the memory and completes the steps in the foregoing methods in combination with hardware thereof.

It should be understood that in this embodiment of the present invention, the processor may be a central processing unit (Central Processing Unit, "CPU" for short), and the processor may further be another general-purpose processor, a digital signal processor (DSP), an application-specific integrated circuit (ASIC), a field-programmable gate array (FPGA) or another programmable logical device, a discrete gate or transistor logical device, a discrete hardware component, or the like. The general-purpose processor may be a microprocessor, or the processor may be any conventional processor, or the like.

In an implementation process, the steps of the foregoing method may be implemented by using a hardware integrated logic circuit in the processor or instructions in a form of software. The steps in the methods disclosed with reference to the embodiments of the present invention may be directly implemented by a hardware processor, or may be implemented by a combination of hardware and software modules in a processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware thereof. Details are not described herein again to avoid repetition.

The signal transmission device 500 according to this embodiment of the present invention may correspond to the transmit-end device in the method in the embodiments of the present invention; moreover, units and modules in the signal transmission device 500 and the foregoing other operations and/or functions are respectively for implementing corresponding procedures in the method 100 in FIG. 2, and to be concise, details are not described herein again.

According to the signal transmission device of this embodiment of the present invention, a target short training sequence needing to be sent to a receive-end device is determined by using a quantity of reception sampling points used by the receive-end device when the receive-end device performs correlation processing, so that only one peak value greater than a preset target threshold exists in a processing result obtained through correlation processing that is performed by the receive-end device on the target short training sequence according to a preset rule, so that the receive-end device can perform initial time synchronization according to a location of the peak value, and can implement fast initial time synchronization.

Figure 13:
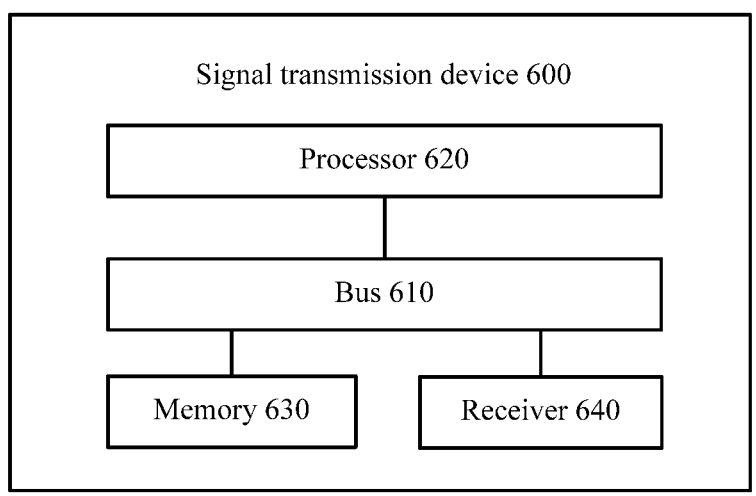
FIG. 13 is a schematic structural diagram of a signal transmission device according to another embodiment of the present invention.

FIG. 13 shows a signal transmission device 600 of an embodiment of the present invention. As shown in FIG. 13, the device 600 includes:

a bus 610;

a processor 620 connected to the bus 610;

a memory 630 connected to the bus 610; and a receiver 640 connected to the bus 610.

The processor 620 invokes, by using the bus 610, a program stored in the memory 630 to determine a quantity of reception sampling points;

when the receiver 640 receives a signal, perform autocorrelation processing on the signal according to the quantity of the reception sampling points and based on a preset rule, where the signal includes a target signal from a transmit-end device, a short training sequence field of the target signal carries a short training sequence symbol, the short training sequence symbol is used to indicate a target short training sequence, the target sequence is generated by the transmit-end device according to a symbol sequence and an initial short training sequence after the transmit-end device generates the initial short training sequence, and the symbol sequence is generated by the transmit-end device according to the quantity of the reception sampling points, so that only one peak value greater than a preset target threshold exists in a processing result obtained through the autocorrelation processing; and determine a location of the peak value, and perform initial time synchronization on the target signal according to the location of the peak value.

Optionally, the processor 620 is specifically configured to perform correlation processing on the target signal according to the following formula:

$$R(d) = \frac{\left(\sum_{k=d}^{d+Np-1} r_k r_{k+Np}^*\right)^2}{\left(\sum_{k=d}^{d+Np-1} |r_k|^2\right) \cdot \left(\sum_{k=d}^{d+Np-1} |r_{k+Np}|^2\right)},$$

where N is a quantity of transmission sampling points included in a sub-sequence b, r represents a sampling value of the received signal, the quantity of the reception sampling points is 2N·p, and d represents an initial reception sampling point used for the correlation processing.

Optionally, the processor 620 is specifically configured to determine the location of the peak value according to the target threshold, where the peak value is greater than the target threshold.

Optionally, the symbol sequence is generated by the transmit-end device by solving a target equation set, and the target equation set is generated by setting a target polynomial in a polynomial to be equal to ±p and setting a non-target polynomial in the polynomial to be not equal to ±p, where the polynomial is $a_i \cdot a_{i+p} + a_{i+1} \cdot a_{i+1+p} + \ldots + a_{i+p-1} \cdot a_{i+2p-1}$, $i \in [0, M-2p]$, the quantity of the reception sampling points is 2N·p, 4≤2p≤M, the target polynomial is $a_{l_0} \cdot a_{l_0+p} + a_{l_0+1} \cdot a_{l_0+1+p} + \ldots + a_{l_0+p-1} \cdot a_{l_0 2p-1}$, $l_0$ is a preset integer, and the non-target polynomial is an expression in the polynomial except the target polynomial.

Optionally, the target polynomial is determined by the transmit-end device according to a quantity n of the sub-sequences b that are in the target short training sequence and that are used for automatic gain control AGC, where $l_0 \geq n$.

Optionally, M=10, p=2, $l_0$=4, and the target equation set is:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}$$

Optionally, the symbol sequence is {1,1,1,−1,1,1,1,1,−1, 1}, and the target short training sequence is {b,b,b,−b,b,b, b,b,−b,b}.

Optionally, the processor 620 is specifically configured to determine that the location of the peak value is an $(l_0 \cdot N+1)^{th}$ point in the target short training sequence.

In this embodiment of the present invention, the processor may also be referred to as a CPU. The memory may include a read-only memory and a random access memory, and provides an instruction and a signal to the processor. A part of the memory may further include a non-volatile random access memory (NVRAM). In a specific application, a signal transmission device may be embedded into or may be, for example, a standard Ethernet communications device such as a personal computer, and modules of the signal transmission device are coupled together by using a bus system. Besides including a signal bus, the bus system further includes a power bus, a control bus, and a status signal bus.

The processor may implement or perform steps and logical block diagrams disclosed in the method embodiments of the present invention. A general-purpose processor may be a microprocessor or the processor may be any conventional processor, decoder, and the like. With reference to the methods disclosed in the embodiments of the present invention, steps may be represented directly as being implemented by a hardware processor, or implemented by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and a decoding unit or processing unit reads information in the memory and completes the steps in the foregoing methods in combination with hardware thereof.

It should be understood that in this embodiment of the present invention, the processor may be a central processing unit (Central Processing Unit, "CPU" for short), and the processor may further be another general-purpose processor, a digital signal processor (DSP), an application-specific integrated circuit (ASIC), a field-programmable gate array (FPGA) or another programmable logical device, a discrete gate or transistor logical device, a discrete hardware component, or the like. The general-purpose processor may be a microprocessor, or the processor may be any conventional processor, or the like.

In an implementation process, the steps of the foregoing method may be implemented by using a hardware integrated logic circuit in the processor or instructions in a form of software. The steps in the methods disclosed with reference to the embodiments of the present invention may be directly implemented by a hardware processor, or may be implemented by a combination of hardware and software modules in a processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware thereof. Details are not described herein again to avoid repetition.

The signal transmission device 600 according to this embodiment of the present invention may correspond to the receive-end device in the method in the embodiments of the present invention; moreover, units and modules in the signal transmission device 600 and the foregoing other operations and/or functions are respectively for implementing corresponding procedures in the method 200 in FIG. 9, and to be concise, details are not described herein again.

According to the signal transmission device of this embodiment of the present invention, a target short training sequence needing to be sent to a receive-end device is determined by using a quantity of reception sampling points used by the receive-end device when the receive-end device performs correlation processing, so that only one peak value greater than a preset target threshold exists in a processing result obtained through correlation processing that is performed by the receive-end device on the target short training sequence according to a preset rule, so that the receive-end device can perform initial time synchronization according to a location of the peak value, and can implement fast initial time synchronization.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signal transmission method, wherein the method comprises:
   in a communications system:
      generating, by a transmit-end device of the communications system, an initial short training sequence, wherein the initial short training sequence comprises M sub-sequences b, and each of the sub-sequences b comprises N transmission sampling points;
      determining a quantity of reception sampling points used by a receive-end device of the communications system when the receive-end device performs autocorrelation processing;
      generating a symbol sequence according to the quantity of the reception sampling points, wherein the symbol sequence is represented as $\{a_0, a_1, \ldots, a_i, \ldots, a_{K-1}\}$, and generating a target short training sequence according to the symbol sequence and the initial short training sequence, wherein the target short training sequence is represented as $\{a_0 b, a_1 b, \ldots a_i b, \ldots, a_{K-1} b\}$, so that only one peak value greater than a preset target threshold exists in a processing result obtained through autocorrelation processing that is performed by the receive-end device on the target short training sequence according to a preset rule;
   determining a location of the one peak value, and performing initial time synchronization on a target signal according to the location of the one peak value; and
   sending the target signal to the receive-end device, wherein a short training sequence field of the target signal carries a short training sequence symbol, and the short training sequence symbol is used to indicate the target short training sequence.

2. The method according to claim 1, wherein the generating a symbol sequence according to the quantity of the reception sampling points comprises:
   determining, according to the quantity of the reception sampling points, a polynomial $a_i \cdot a_{i+p} + a_{i+1} \cdot a_{i+1+p} + L + a_{i+p-1} \cdot a_{i+2p-1}$, $i \in [0, M-2p]$, wherein the quantity of the reception sampling points is $2N \cdot p$, and $4 \leq 2p \leq M$;
   determining a target polynomial $a_{l_0} \cdot a_{l_0+p} + a_{l_0+1} \cdot a_{l_0+1+p} + L + a_{l_0+p-1} \cdot a_{l_0+2p-1}$, wherein $l_0$ is a preset integer;
   setting the target polynomial to be equal to $\pm p$, and setting a non-target polynomial to be not equal to $\pm p$ to generate a target equation set, wherein the non-target polynomial is an expression in the polynomial except the target polynomial; and
   solving the target equation set, to generate the symbol sequence.

3. The method according to claim 2, wherein the determining a target polynomial comprises:
   determining the target polynomial according to a quantity n of the sub-sequences b that are in the target short training sequence and that are used for automatic gain control AGC, to satisfy: $l_0 \geq n$.

4. The method according to claim 2, wherein M=10 p=2, $l_0$=4 and the target equation set is:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}.$$

5. The method according to claim 1, wherein the symbol sequence is $\{1,1,1,-1,1,1,1,1,-1,1\}$, and the target short training sequence is $\{b,b,b,-b,b,b,b,b,-b,b\}$.

6. A signal transmission method, wherein the method comprises:
   in a communications system:
      determining, by the communications system, a quantity of reception sampling points;
      when a signal is received, performing autocorrelation processing on the signal according to the quantity of the reception sampling points and based on a preset rule, wherein the signal comprises a target signal from a transmit-end device, a short training sequence field of the target signal carries a short training sequence symbol, the short training sequence symbol is used to indicate a target short training sequence, the target sequence is generated by the transmit-end device according to a symbol sequence and an initial short training sequence after the transmit-end device generates the initial short training sequence, and the symbol sequence is generated by the transmit-end device according to the quantity of the reception sampling points, so that only one peak value greater than a preset target threshold exists in a processing result obtained through the autocorrelation processing, a location of the one peak value is determined, and initial time synchronization is performed on a target signal according to the location of the one peak value; and determining, by the communications system, a location of the peak value, and performing initial time synchronization on the target signal according to the location of the peak value.

7. The method according to claim 6, wherein the performing autocorrelation processing on a signal according to the quantity of the reception sampling points and based on a preset rule comprises:
performing autocorrelation processing on the target signal according to the following formula:

$$R(d) = \frac{\left(\sum_{k=d}^{d+Np-1} r_k r_{k+Np}^*\right)^2}{\left(\sum_{k=d}^{d+Np-1} |r_k|^2\right) \cdot \left(\sum_{k=d}^{d+Np-1} |r_{k+Np}|^2\right)},$$

wherein N is a quantity of transmission sampling points comprised in a sub-sequence b, r represents a sampling value of the received signal, the quantity of the reception sampling points is 2N·p, and d represents an initial reception sampling point used for the autocorrelation processing.

8. The method according to claim 6, wherein the symbol sequence is generated by the transmit-end device by solving a target equation set, and the target equation set is generated by setting a target polynomial in a polynomial to be equal to ±p and setting a non-target polynomial in the polynomial to be not equal to +p, wherein the polynomial is $a_i \cdot a_{i+p} + a_{i+1} \cdot a_{i+1+p} + L + a_{i+p-1} \cdot a_{i+2p-1}$, $i \in [0, M-2p]$, the quantity of the reception sampling points is 2N·p, 4≤2p≤M, the target polynomial is $a_{l_0} \cdot a_{l_0+p} + a_{l_0+1} \cdot a_{l_0+1+p} + L + a_{l_0+p-1} \cdot a_{l_0+2p-1}$, $l_0$ is a preset integer, and the non-target polynomial is an expression in the polynomial except the target polynomial.

9. The method according to claim 6, wherein the symbol sequence is {1,1,1,−1,1,1,1,1,−1,1}, and the target short training sequence is {b,b,b,−b,b,b,b,b,−b,b}.

10. The method according to claim 8, wherein the performing initial time synchronization on the target signal according to the location of the peak value comprises:
determining that the location of the peak value is an $(l_0 \cdot N+1)^{th}$ point in the target short training sequence.

11. A signal transmission apparatus, wherein the apparatus comprises:
a processor, configured to:
generate an initial short training sequence, wherein the initial short training sequence comprises M sub-sequences b, and each of the sub-sequences b comprises N transmission sampling points;
determine a quantity of reception sampling points used by a receive-end device when the receive-end device performs autocorrelation processing;
generate a symbol sequence according to the quantity of the reception sampling points, wherein the symbol sequence is represented as $\{a_0, a_1, \ldots, a_i, \ldots, a_{K-1}\}$;
generate a target short training sequence according to the symbol sequence and the initial short training sequence, wherein the target short training sequence is represented as $\{a_0 b, a_1 b, \ldots, a_i b, \ldots, a_{K-1} b\}$, so that only one peak value greater than a preset target threshold exists in a processing result obtained through autocorrelation processing that is performed by the receive-end device on the target short training sequence according to a preset rule, and determine a location of the one peak value, and performing initial time synchronization on a target signal according to the location of the one peak value; and
a transmitter, in communication with the processor and configured to send a target signal to the receive-end device, wherein a short training sequence field of the target signal carries a short training sequence symbol, and the short training sequence symbol is used to indicate the target short training sequence.

12. The apparatus according to claim 11, wherein the processor is configured to: determine, according to the quantity of the reception sampling points a polynomial $a_i \cdot a_{i+p} + a_{i+1} \cdot a_{i+1+p} + L + a_{i+p-1} \cdot a_{i+2p-1}$, $i \in [0, M-2p]$, wherein the quantity of the reception sampling points is 2N·p, and 4≤2p≤M;
determine a target polynomial $a_{l_0} \cdot a_{l_0+p} + a_{l_0+1} \cdot a_{l_0+1+p} + L + a_{l_0+p-1} \cdot a_{l_0+2p-1}$, wherein $l_0$ is a preset integer;
set the target polynomial to be equal to ±p, and set a non-target polynomial to be not equal to ±p, to generate a target equation set, wherein the non-target polynomial is an expression in the polynomial except the target polynomial; and
solve the target equation set, to generate the symbol sequence.

13. The apparatus according to claim 12, wherein the processor is configured to determine the target polynomial according to a quantity n of the sub-sequences b that are in the target short training sequence and that are used for automatic gain control AGC, to satisfy: $l_0 \geq n$.

14. The apparatus according to claim 12, wherein M=10, p=2, $l_0$=4, and the target equation set is:

$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}$$

15. The apparatus according to claim 11, wherein the symbol sequence is {1,1,1,−1,1,1,1,1,−1,1}, and the target short training sequence is {b,b,b,−b,b,b,b,b,−b,b}.

16. A signal transmission apparatus, wherein the apparatus comprises:
a processor, configured to determine a quantity of reception sampling points;
a receiver, in communication with the processor and configured to receive a signal; and
the processor is further configured to perform autocorrelation processing on the signal according to the quantity of the reception sampling points and based on a preset rule, wherein the signal comprises a target signal from a transmit-end device, a short training sequence field of the target signal carries a short training sequence symbol, the short training sequence symbol is used to indicate a target short training sequence, the target sequence is generated by the transmit-end device according to a symbol sequence and an initial short training sequence after the transmit-end device generates the initial short training sequence, the symbol sequence is generated by the transmit-end device according to the quantity of the reception sampling points, so that only one peak value greater than a preset target threshold exists in a processing result obtained through the autocorrelation processing, and a location of the one peak value is determined, and initial time synchronization is performed on a target signal according to the location of the one peak value; and determine a location of the one peak value, and perform initial time synchronization on the target signal according to the location of the one peak value.

17. The apparatus according to claim 16, wherein the processor is configured to perform autocorrelation processing on the target signal according to the following formula:

$$R(d) = \frac{\left(\sum_{k=d}^{d+Np-1} r_k r_{k+Np}^*\right)^2}{\left(\sum_{k=d}^{d+Np-1} |r_k|^2\right) \cdot \left(\sum_{k=d}^{d+Np-1} |r_{k+Np}|^2\right)},$$

wherein N is a quantity of transmission sampling points comprised in a sub-sequence b, r represents a sampling value of the received signal, the quantity of the reception sampling points is 2N·p, and d represents an initial reception sampling point used for the autocorrelation processing.

18. The apparatus according to claim 16, wherein the symbol sequence is generated by the transmit-end device by solving a target equation set, and the target equation set is generated by setting a target polynomial in a polynomial to be equal to ±p and setting a non-target polynomial in the polynomial to be not equal to ±p, wherein the polynomial is $a_i \cdot a_{i+p} + a_{i+1} \cdot a_{i+1+p} + L + a_{i+p-1} \cdot a_{i+2p-1}$, i∈[0,M−2p], the quantity of the reception sampling points is 2N·p, 4≤2p≤M, the target polynomial is $a_{l_0} \cdot a_{l_0+p} + a_{l_0+1} \cdot a_{l_0+1+p} + L + a_{l_0+p-1} \cdot a_{l_0 2p-1}$, $l_0$ is a preset integer, and the non-target polynomial is an expression in the polynomial except the target polynomial.

19. The apparatus according to claim 16, wherein the symbol sequence is {1,1,1,−1,1,1,1,1,−1,1}, and the target short training sequence is {b,b,b,−b,b,b,b,b,−b,b}.

20. The apparatus according to claim 18, wherein the processor is configured to determine that the location of the peak value is an $(l_0 \cdot N+1)^{th}$ point in the target short training sequence.

* * * * *

UNITED STATES PATENT AND TRADEMARK OFFICE
CERTIFICATE OF CORRECTION

PATENT NO. : 10,187,242 B2  
APPLICATION NO. : 15/280016  
DATED : January 22, 2019  
INVENTOR(S) : Yang Yang et al.

Page 1 of 2

It is certified that error appears in the above-identified patent and that said Letters Patent is hereby corrected as shown below:

In the Claims

Column 40, Line 30 (approx.):

In Claim 4, delete "
$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}$$
" and insert --
$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 = \pm 2 \\ a_5 \cdot a_7 + a_6 \cdot a_8 \neq \pm 2 \\ a_6 \cdot a_8 + a_7 \cdot a_9 \neq \pm 2 \end{cases}$$
--, therefor.

Column 41, Line 30 (approx.):  
In Claim 8, delete "+p," -- $\pm p$, --, therefor.

Column 41, Line 31 (approx.):  
In Claim 8, delete "$a_i \cdot a_{i+p} + a_{i+1} \cdot a_{i+1} \cdot a_{i+1+p} + L + a_{i+p-1} \cdot a_{i+2p-1}$," and insert -- $a_i \cdot a_{i+p} + a_{i+1} \cdot a_{i+1+p} + \cdots + a_{i+p-1} \cdot a_{i+2p-1}$ --, therefor.

Column 41, Line 33 (approx.):  
In Claim 8, delete "$a_{l_0} \cdot a_{l_0+p} + a_{l_0+1} \cdot a_{l_0+1+p} + L + a_{l_0+p-1} \cdot a_{l_0+2p-1}, l_0$" and insert -- $a_{l_0} \cdot a_{l_0+p} + a_{l_0+1} \cdot a_{l_0+1+p} + \cdots + a_{l_0+p-1} \cdot a_{l_0+2p-1}, l_0$ --, therefor.

Column 42, Line 13:  
In Claim 12, after "sampling points" insert -- , --, therefor.

Signed and Sealed this  
Twelfth Day of November, 2019

Andrei Iancu  
*Director of the United States Patent and Trademark Office*

CERTIFICATE OF CORRECTION (continued)
U.S. Pat. No. 10,187,242 B2

Column 42, Line 14:
In Claim 12, delete "$a_i \cdot a_{i+p} + a_{i+1} \cdot a_{i+1} \cdot a_{i+1+p} + L + a_{i+p-1} \cdot a_{i+2p-1}$," and insert --$a_i \cdot a_{i+p} + a_{i+1} \cdot a_{i+1+p} + \cdots + a_{i+p-1} \cdot a_{i+2p-1}$,--, therefor.

Column 42, Line 17 (approx.):
In Claim 12, delete "$a_{l_0} \cdot a_{l_0+p} + a_{l_0+1} \cdot a_{l_0+1+p} + L + a_{l_0+p-1} \cdot a_{l_0+2p-1}$," and insert --$a_{l_0} \cdot a_{l_0+p} + a_{l_0+1} \cdot a_{l_0+1+p} + \cdots + a_{l_0+p-1} \cdot a_{l_0+2p-1}$,--, therefor.

Column 42, Line 35 (approx.):
In Claim 14, delete "
$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 \neq \pm 2 \\ a_5 \cdot a_7 + a_6 \cdot a_8 \neq \pm 2 \\ a_6 \cdot a_8 + a_7 \cdot a_9 \neq \pm 2 \end{cases}$$
" and insert --
$$\begin{cases} a_0 \cdot a_2 + a_1 \cdot a_3 \neq \pm 2 \\ a_1 \cdot a_3 + a_2 \cdot a_4 \neq \pm 2 \\ a_2 \cdot a_4 + a_3 \cdot a_5 \neq \pm 2 \\ a_3 \cdot a_5 + a_4 \cdot a_6 \neq \pm 2 \\ a_4 \cdot a_6 + a_5 \cdot a_7 = \pm 2 \\ a_5 \cdot a_7 + a_6 \cdot a_8 \neq \pm 2 \\ a_6 \cdot a_8 + a_7 \cdot a_9 \neq \pm 2 \end{cases}$$
--, therefor.

Column 44, Line 10:
In Claim 18, delete "$a_i \cdot a_{i+p} + a_{i+1} \cdot a_{i+1} \cdot a_{i+1+p} + L + a_{i+p-1} \cdot a_{i+2p-1}$," and insert --$a_i \cdot a_{i+p} + a_{i+1} \cdot a_{i+1+p} + \cdots + a_{i+p-1} \cdot a_{i+2p-1}$,--, therefor.

Column 44, Line 12 (approx.):
In Claim 18, delete "$a_{l_0+p} + a_{l_0+1} \cdot a_{l_0+1+p} + L + a_{l_0+p-1} \cdot a_{l_0+2p-1}$, $l_0$" and insert --$a_{l_0} \cdot a_{l_0+p} + a_{l_0+1} \cdot a_{l_0+1+p} + \cdots + a_{l_0+p-1} \cdot a_{l_0+2p-1}$, $l_0$--, therefor.